United States Patent
Martin et al.

(10) Patent No.: US 11,937,532 B2
(45) Date of Patent: Mar. 26, 2024

(54) TWO-STAGE ROW CLOSING ASSEMBLY

(71) Applicant: Ronald Steve Martin, Elkton, KY (US)

(72) Inventors: Ronald Steve Martin, Elkton, KY (US); Chad Anthony Koudela, Brazoria, TX (US)

(73) Assignee: Ronald Martin, Elkton, KY (US)

( * ) Notice: Subject to any disclaimer, the term of this patent is extended or adjusted under 35 U.S.C. 154(b) by 764 days.

(21) Appl. No.: 16/947,255

(22) Filed: Jul. 24, 2020

(65) Prior Publication Data

US 2022/0022363 A1 Jan. 27, 2022

(51) Int. Cl.
*A01C 5/06* (2006.01)
*A01C 7/20* (2006.01)

(52) U.S. Cl.
CPC .............. *A01C 5/068* (2013.01); *A01C 5/066* (2013.01); *A01C 7/203* (2013.01); *A01C 7/205* (2013.01)

(58) Field of Classification Search
CPC ......... A01C 5/066; A01C 5/068; A01C 7/203; A01C 7/205
See application file for complete search history.

(56) References Cited

U.S. PATENT DOCUMENTS

| | | | | |
|---|---|---|---|---|
| 2,849,969 | A * | 9/1958 | Taylor | A01C 23/025 |
| | | | | 111/190 |
| 3,060,873 | A * | 10/1962 | Powers | A01C 7/06 |
| | | | | 222/614 |
| 4,760,806 | A * | 8/1988 | Bigbee | A01C 5/064 |
| | | | | 111/167 |
| 5,697,455 | A * | 12/1997 | Deckler | A01C 5/062 |
| | | | | 172/624.5 |
| 6,871,709 | B2 * | 3/2005 | Knobloch | A01B 49/027 |
| | | | | 172/705 |
| 8,939,095 | B2 * | 1/2015 | Freed | A01B 63/008 |
| | | | | 111/926 |
| 9,148,989 | B2 * | 10/2015 | Van Buskirk | A01C 5/066 |
| 9,706,703 | B2 * | 7/2017 | Anderson | A01C 7/205 |
| 9,750,176 | B2 * | 9/2017 | Raetzman | A01C 5/068 |
| 9,943,030 | B2 * | 4/2018 | Sheppard | A01C 7/205 |
| 2020/0396894 | A1 * | 12/2020 | Radtke | A01B 63/008 |

* cited by examiner

*Primary Examiner* — Alicia Torres
(74) *Attorney, Agent, or Firm* — Duncan Galloway Greenwald PLLC; Kevin T. Duncan

(57) ABSTRACT

An apparatus and system for positioning a trailing wheel behind a row planting unit in a row planting system and for transferring weight between a row closing unit with row closing wheels and a trailing wheel while providing for independent movement of the trailing wheel and row closing wheels is provided. A trailing or firming wheel assembly is positioned behind a row closing unit with a set of row closing wheels. A cam-based depth limiting system provides for a depth stop and depth limiting adjustments while providing for independent movement of the trailing wheel and set of row closing wheels.

20 Claims, 22 Drawing Sheets

TWO-STAGE ROW CLOSING ASSEMBLY

FIELD OF THE INVENTION

The present disclosure is generally applicable to the field of agricultural equipment, and more particularly for improved row closing and row cleaning in no-till farming applications and for improved row cleaning and for the closing of seed troughs.

AUTHORIZATION PURSUANT TO 37 C.F.R. § 1.171 (d)(c)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The background description includes information that may be useful in understanding the present invention. It is not an admission that any of the information provided herein is prior art or relevant to the presently claimed invention, or that any publication specifically or implicitly referenced is prior art.

In traditional and longstanding farming methods, tilling or tillage is typically used before planting to prepare a field. Tilling a field has both herbicidal and insecticidal benefits and may serve to break up the earth to enable seedlings to more easily extend root systems. However, there are downsides to tillage that are driving modern farmers towards "low-till" or "no-till" farming systems. In these farming systems, plant matter left over from previous harvests, called residue, is left in the fields between plantings. At the time of planting, a row cleaner system is used at the front or leading portion of a planter row unit to clear only a small portion or strip of earth of the residue to enable seeds and fertilizer to be placed in the ground in connection with a coulter or other tillage tool. The row cleaner removes the residue and only very lightly tills the topmost soil or earth to provide for a clear path for seed and fertilizer placement. One key aspect to row cleaner operation is to maintain necessary clearance between the row cleaner and the coulter or other tillage tool for terrain responsive operation. Also, at the trailing end of the planter row unit closing wheels are used to close the seed slot opened during row planting operation. This operation is known as row closing and may comprise multiple stages or steps in the closing operation including a first closing operation by a set of closing wheels and a second closing operation by a second closing means.

No-till farming systems provide for benefits including increased water retention and absorption, and increased presence of beneficial fungi, bacteria, and fauna (e.g., earthworms). The use of a no-till farming system has the additional benefit of reducing topsoil erosion that may be caused by tilling. In no-till systems it has also been shown that because water retention is greater and soil erosion is reduced, the environmental impact from the runoff of fertilizer, herbicides, and pesticides is also reduced.

The movement towards no-till farming systems has driven the improvement of row cleaner apparatuses for planting systems. Existing row cleaner systems include fixed row cleaners, adjustable row cleaners, and floating row cleaners.

However, these existing row cleaner systems have drawbacks. Fixed row cleaners do not follow or track changes in land elevation as the planter moves over a field. Adjustable and floating row cleaners may not possess the ideal geometry with respect to a planter to provide for optimal row cleaning action by the cleaner wheel assemblies. Additionally, after seeds have been planted the open planted row need to be closed. Existing row closing assemblies comprise similar drawbacks and limitations to those of existing row cleaners. Namely, existing row closing assemblies do not maintain an ideal desired geometry for closing wheels as the closing wheels and row closing assembly travel over terrain. Moreover, existing row closing assemblies do not provide for independent vertical travel of first and second stage row closing operations to accommodate for changes in soil height and condition along a planted row or across all row closing units on a row planter.

For example, as the row closing wheel assemblies of the prior art travel down a row, they may rise and fall with changes in row elevation. However, these changes in elevation cause a change in the geometry, or orientation, of the row closing wheels relative to the row being closed. If the closing wheel assembly is at too low of an angle, the closing action of the wheel assembly may be considered "negative" as opposed to the desired "positive" closing action of a level closing wheel assembly. Prior art closing wheel assemblies can be centered over an open row or seed slot where seeds have been planted. However, most cannot be adjusted at all, or if they can be adjusted they cannot be adjusted to compensate for changes in elevation over a row or seed slot.

A 13" spading closing wheel is 1" greater in diameter than a standard smooth closing wheel. This is by design to allow the wheels to engage the soil and effectively close the seed slot. When working in looser soils, the spading closing wheels frequently engage the soil deeper than in firmer soils. To help reduce this excessive soil engagement, down pressure may need to be reduced, e.g., to a minimum setting, by adjusting the angle of the entire closing wheel assembly. Greater down pressure settings tend to lower the rear of the closing wheel arm assembly, which reduces the gathering action of the two spading closing wheels. Additionally, separate closing means on a single row unit may need to operate or move independently of one another to accommodate for changes in soil height or condition and existing row closing units cannot do so.

Existing row cleaning and closing units are described in at least U.S. patent application Ser. No. 16/593,765, entitled COMPACT ROW CLOSER AND ROW CLEANER ASSEMBLIES, filed 4 Oct. 2019, Martin et at.; U.S. Prov. Pat. App. No. 62/741,438, entitled COMPACT PARALLEL ARM ROW CLOSER AND ROW CLEANER, filed 4 Oct. 2018, Martin et al.; U.S. Prov. Pat. App. 62/803,420, entitled IMPROVED ROW CLEANER/CLOSING WHEEL, filed 8 Feb. 2019, Martin et al.; and U.S. Prov. Pat. App. No. 62/804,208, entitled IMPROVED ROW CLOSING WHEEL ASSEMBLY, filed 11 Feb. 2019, Martin et al., each of which are incorporated by reference herein in their entirety.

What is needed is a compact row closing assembly and/or row cleaning assembly that can both follow or track changes in land elevation and maintain an optimal geometry or angle with respect to the planter or plater system to provide for optimal row cleaning operation and/or positive row closing action with minimal soil engagement and down pressure.

Another problem with existing row closer wheel designs is that the relative angle of the wheels with respect to the frame can be difficult to change for any given set of closer wheels.

Yet another problem is providing for the independent travel of different row closing unit stages while providing for consistent closing depth and soil engagement and proper treatment of the seed trench and/or soil after the first closing operation.

SUMMARY OF THE INVENTION

To address the issues identified hereinabove and to provide further improvements to row closing assemblies, the present invention provides a two-stage row closing system comprising a first stage row closing assembly and a second stage row closing assembly. The first stage row closing assembly comprises a set of row closing wheels disposed on a frame. The frame may be a frame having a T-handle and spring assembly for adjusting a down pressure or engagement depth for a set of closing wheels, or may be a floating frame having a spring, spring and shock, pneumatic or fluid actuator, or electro-mechanical actuator for adjusting the down pressure or engagement depth for a set of closing wheels. Either frame may further comprise lever-adjustable hubs for changing the "toe in" or angle of engagement of the closing wheels with soil.

The second stage row closing assembly comprises a swing arm or firming wheel frame for mounting a firming wheel or second stage closing wheel relatively behind the first stage row closing assembly. The frame of the second stage row closing assembly positions a second stage row closer, which may be a press wheel, a firming wheel, set of cog wheels, drag chain, set of plastic spiked wheels, or other suitable second stage closing means. The firming wheel may be made from cast iron, steel, plastic, or other suitable material and may further comprise a hard or soft rubber outer surface. The rubber surface may be toothed, grooved, or shaped to provide for the proper crumbling, tamping, and compressing of soil on a seed trench.

The second stage row closing assembly may have a down pressure that is adjusted or provided independently of the first stage row closing assembly or may be linked to the first stage row closing assembly. If the down pressure of the second stage row closing assembly is adjusted independently of the first stage row closing assembly, a spring, spring and shock, pneumatic or fluid actuator, or electro-mechanical actuator for adjusting the down pressure may be used wherein one end of the means for adjusting the down pressure is attached to a part of the row unit frame and the other end is attached to the second stage row closing unit frame.

If the down pressure is linked to the row closing unit, the pressure or bias from the means for applying down pressure of the first stage row closing unit is transferred to the second stage row closing unit through the frame of the second stage row closing unit. In one embodiment, the frame of the second stage row closing unit is pivotally mounted to the frame for the first stage row closing unit and may move independently from the first stage row closing unit. A depth or travel limiting system, which may be a cam and cam follower system, provides for an adjustment of the engagement between the second stage frame and the first stage frame.

When the cam of the depth limiting system abuts the cam follower, the down pressure applied to the first stage row closing unit is transferred to the second stage row closing unit frame and subsequently to the second stage row closer (e.g., firming wheel) and the first and second stages are "locked" or move in unison. For example, both first and second stages in this condition may move downwards relative to a row unit on row planter together. Additionally, because the second stage row closing unit is pivotally attached to the first stage row closing unit, the first stage row closing unit may move upwards independently from the second stage row closing unit, such as when the first stage encounters a change in soil height or condition prior to the second stage encountering the same change. In this manner, the second stage row closing unit will always remain in contact and engagement with the soil even when the first stage row closing unit is caused to be move upwards relative to the second stage. When the change in elevation is traversed by both first and second stages, the second stage will again abut and move in unison with the first stage, have the down pressure of the first stage transferred to the second stage, and again limit the soil engagement depth of the row closing wheels of the first stage row closing unit.

In an embodiment, the present invention provides a two-stage row closing system, the system comprising: a first stage row closing unit; and a second stage row closing unit, the second stage row closing unit comprising: a first frame assembly fixedly secured to the first stage row closing unit; a second frame assembly rotatably secured to the first frame assembly such that the second frame assembly may move independently relative to the first frame assembly; and a depth limiting assembly adapted to provide an upper limit on the rotational movement of the second frame assembly relative to the first frame assembly.

The two-stage row closing system of the above embodiment may further comprise, wherein the depth limiting assembly comprises a cam and cam stop. The two-stage row closing system may further comprise, wherein the depth limiting assembly, when engaged at the upper limit, permits the first stage row closing unit and second stage row closing unit to move together. The two-stage row closing system may further comprise, wherein the depth limiting assembly, when engaged at the upper limit, permits the transfer of a down pressure force from the first stage row closing unit to the second stage row closing unit. The two-stage row closing system may further comprise, further comprising a wheel assembly. The two-stage row closing system may further comprise, wherein the wheel assembly comprises a firming wheel. The two-stage row closing system may further comprise, wherein the two-stage row closing system is hinged at the connection between the first frame assembly and the second frame assembly. The two-stage row closing system may further comprise, wherein the depth limiting assembly comprises an adjustment means. The first stage row closing unit may comprise one of a single row closing wheel or a pair of row closing wheels.

In another embodiment, the present invention provides a row closing unit, the row closing unit comprising: a first frame assembly fixedly secured to a frame of a first stage row closing unit; a second frame assembly rotatably secured to the first frame assembly such that the second frame assembly may move independently relative to the first frame assembly; and a depth limiting assembly adapted to provide an upper limit on the rotational movement of the second frame assembly relative to the first frame assembly.

The row closing unit of the above embodiment may further comprise, wherein the depth limiting assembly comprises a cam and cam stop. The row closing unit may further comprise, wherein the depth limiting assembly, when engaged at the upper limit, permits the first stage row closing unit and second stage row closing unit to move together. The row closing unit may further comprise, wherein the depth limiting assembly, when engaged at the upper limit, permits the transfer of a down pressure force from the first stage row closing unit to the second stage row closing unit. The row closing unit may further comprise, further comprising a wheel assembly. The row closing unit may further comprise, wherein the wheel assembly comprises a firming wheel. The row closing unit may further comprise, wherein the two-stage row closing system is hinged at the connection between the first frame assembly and the second frame assembly. The row closing unit may further comprise, wherein the depth limiting assembly comprises an adjustment means.

BRIEF DESCRIPTION OF THE FIGURES

In order to facilitate a full understanding of the present invention, reference is now made to the accompanying drawings, in which like elements are referenced with like numerals. These drawings should not be construed as limiting the present invention, but are intended to be exemplary and for reference.

In order that the advantages of the cleaning wheel will be readily understood, a more particular description of the assemblies briefly described above will be rendered by reference to specific embodiments illustrated in the appended drawings. Understanding that these drawings depict only typical embodiments of the cleaning wheel and are not therefore to be considered limited of its scope, the assemblies will be described and explained with additional specificity and detail through the use of the accompanying drawings.

DETAILED DESCRIPTION

Figure 1:
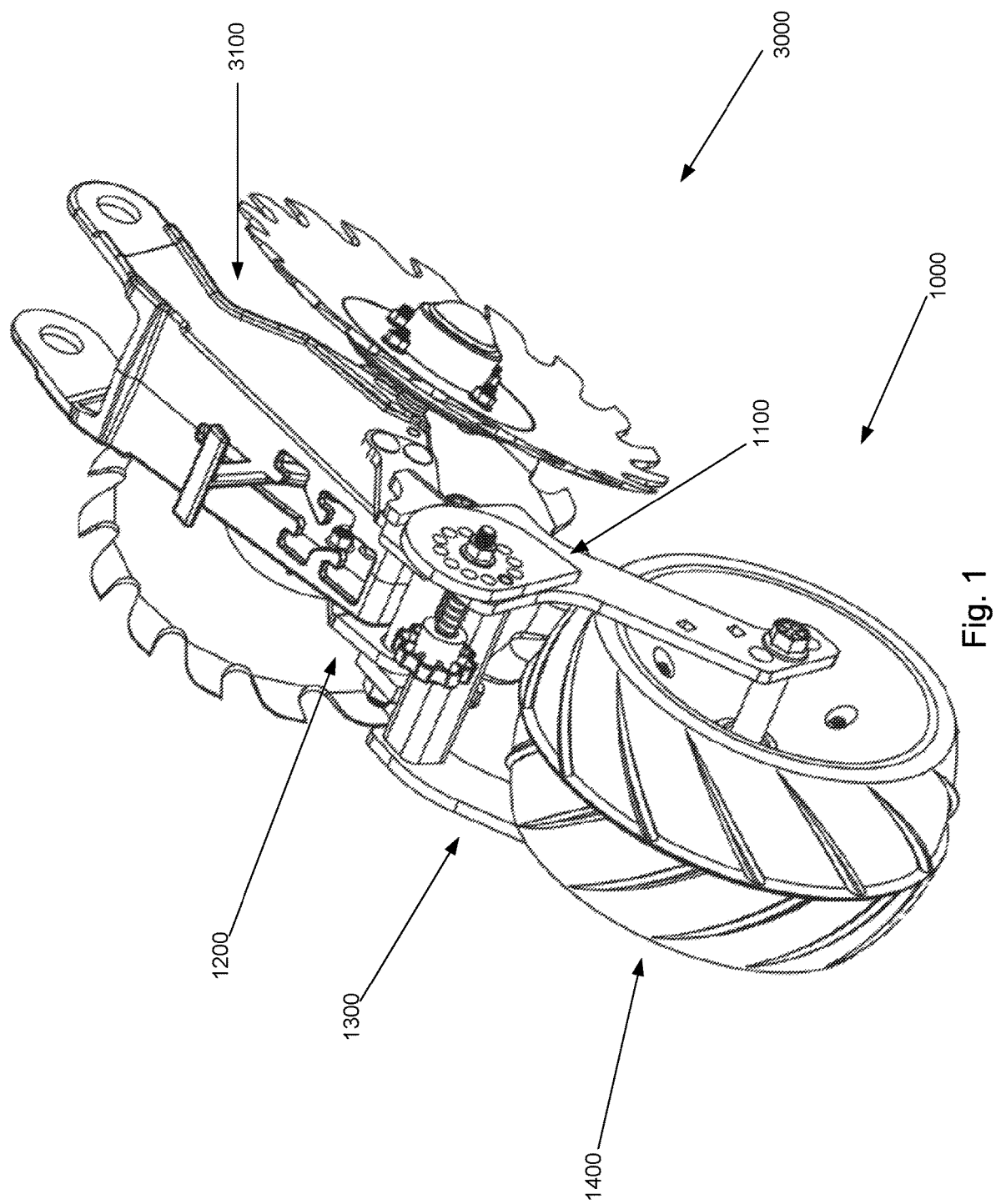
FIGS. 1-7 provide various views of a row closing/planting system for a row unit on a row planter using a first stage row closing assembly that is depth limited by a cam assembly on a second stage row closing assembly according to an embodiment of the present invention.
Figure 2:
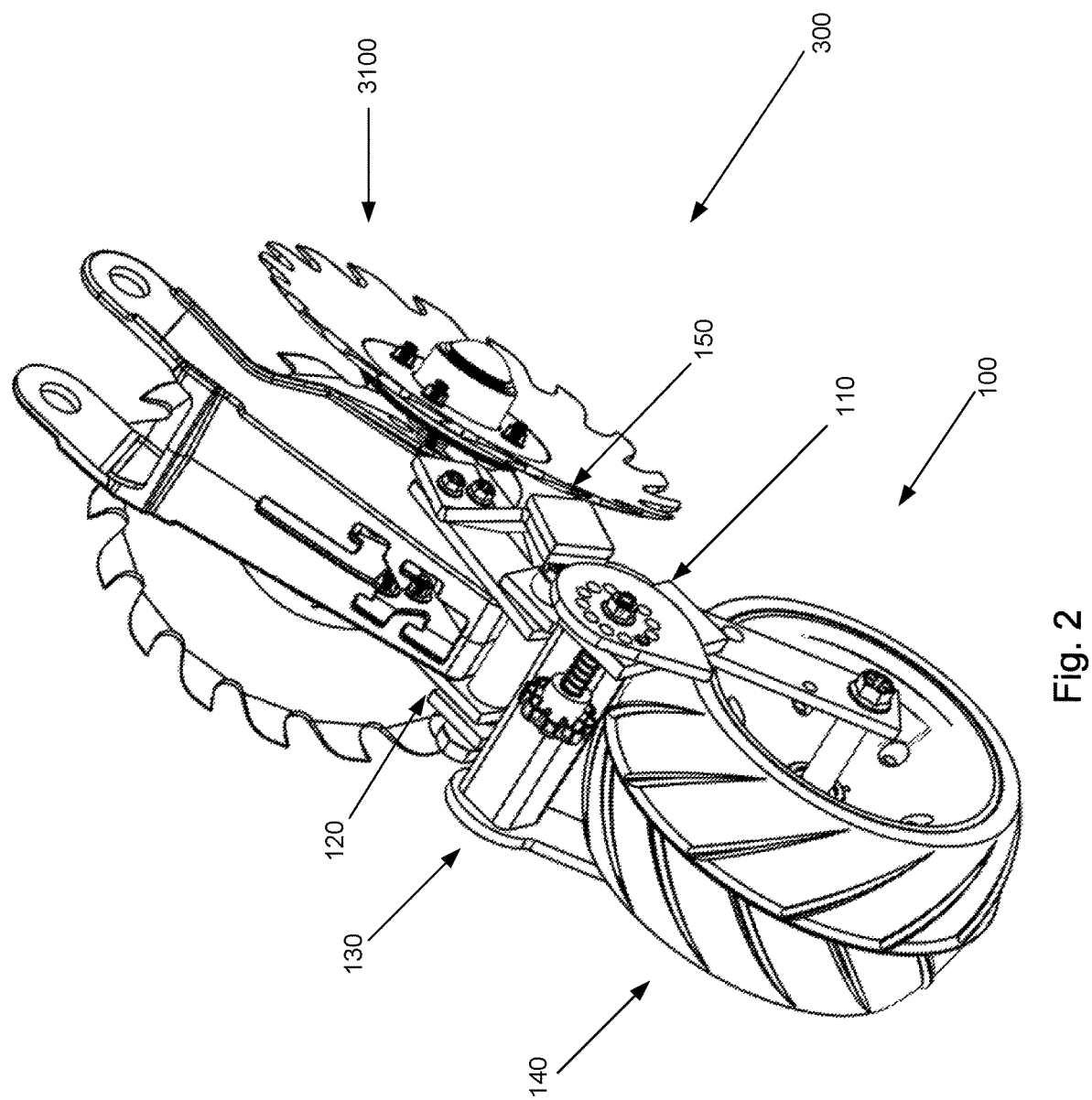

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used herein, "fastener" may mean any suitable fastening means such as a nut and bolt, a rivet, or a pin and cotter pin. Typically, as used herein a fastener refers to a threaded bolt, which may have a hexagonal bolt head, secured by a correspondingly threaded nut having a hexagonal outer surface, wherein one or more washers may be used to permit movement of a fastened object about the bolt. In some embodiments, a locking nut may be used to further secure the nut to the bolt and to prevent the nut from backing off of the threads of the bolt.

With reference now to FIGS. 1-7, views of a two-stage row closing system 3000 comprising a first stage closing unit 3100 and a second stage closing unit 1000 comprising a depth stop and limiting assembly 1100 are provided. The first stage row closing unit 3100 may be an existing row closing unit design for use with, for example JOHN DEERE row units and row planters. Additionally, the first stage row closing unit 3100 may be one such as those shown and described in U.S. Pat. No. 9,743,572, entitled ADJUSTABLE ROW CLEANER, to Martin, issued Aug. 29, 2017, and in U.S. Pat. No. 7,975,629, entitled CLOSING WHEEL ASSEMBLY, to Martin, issued Jul. 12, 2011, both of which are incorporated by reference herein in their entirety.

Referring again to FIGS. 1-7, the second stage row closing unit 1000 comprises a cam-based depth stop and limiting assembly or cam assembly 1100, a first frame assembly 1200, a second frame assembly 1300, and a wheel assembly 1400. In another embodiment, shown in FIG. 2, the two-stage closing system 300 comprises the first stage closing unit 3100 and a second stage closing unit 100, the second stage closing unit 100 comprising a cam assembly 110, a first frame assembly 120, second frame assembly 130, and a wheel assembly 140. The second stage closing unit 100 shown in FIG. 2 differs from the closing unit 1000 shown in FIGS. 1 and 3-7 primarily in the construction of the first 120 and second 130 frame assemblies and the positioning of the cam stop or follower 150 on a separate or independent plate from the first frame assembly 120 whereas it is integrated into the first frame assembly 1200 of the second stage closing unit 1000 of FIG. 1.

Figure 3:
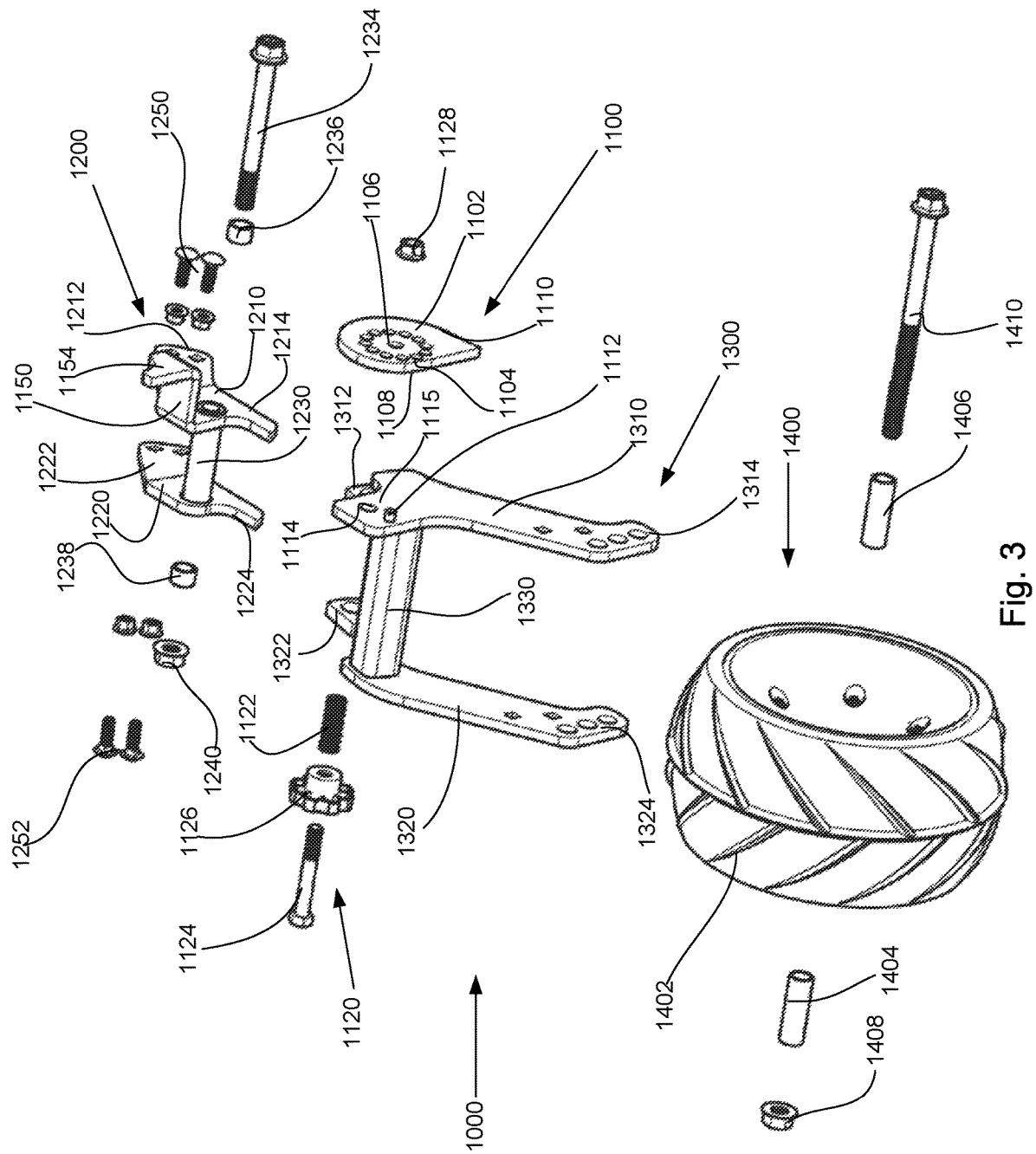

Referring now specifically to FIG. 3, an exploded isometric view of the second stage closing unit 1000 is provided. The second stage closing unit 1000 comprises the cam assembly 1100, the first frame assembly 1200, second frame assembly 1300, and wheel assembly 1400. Elements of the cam assembly 1100 are disposed on the first frame assembly 1200 and the second frame assembly 1300. The first frame assembly 1200 is fixedly secured, attached, or installed on the first stage closing unit 3100 using, for example, fasteners 1250 and 1252 which may be a set of bolts and nuts.

The first frame assembly 1200 comprises a first frame plate 1210, and a second frame plate 1220. The first frame plate 1210 comprises a proximal end having a mounting portion 1212 and a distal end having a protrusion or extension 1214. The second frame plate 1220 comprises a proximal end having a mounting portion 1222 and a distal end having a protrusion or extension 1224. A spacer or support 1230 positions and joins the first frame plate 1210 to the second frame plate 1220 and also permits the second frame assembly 1300 to be movably secured to the first frame assembly 1200 using a threaded bolt 1234 and a nut or fastener 1240 and further using bushings or spacers 1236 and 1238. The protrusions or extensions 1214 and 1224 of the respective first plate 1210 and 1220 provide for a bottom travel limit for the rotation of the second frame assembly 1300 when secured to the first frame assembly 1200 such that the second frame assembly 1300 may not rotate beyond or travel below the extensions 1214 and 1224. This may further provide for the wheel assembly 1400 to be raised above the soil or ground surface in certain conditions.

The second frame assembly 1300 is rotatably installed or secured to the first frame assembly 1200 at the mounting frame portions 1312 and 1322 of the respective first arm 1310 and second arm 1320. The first arm 1310 comprises the arm 1310 having a frame mounting portion 1312 and a wheel mounting portion 1314, the wheel mounting portion 1314 comprising a set of wheel mounting locations to provide for mounting or installing the wheel assembly 1400 in one of a plurality of mounting positions. The second arm 1320 comprises the arm 1320 having a frame mounting portion 1322 and a wheel mounting portion 1324, the wheel mounting portion 1324 comprising a set of wheel mounting locations. A support spacer 1330 positions and provides structural support to the first arm 1310 and second arm 1320 of the second frame assembly 1300 and further acts with and on the extensions 1214 and 1224 to provide a lower travel limit for the second frame assembly 1300.

The wheel assembly 1400 comprises a wheel 1402 which is installed at any of the wheel mounting positions of the wheel mounting portions 1314 and 1324 between the first arm 1310 and second arm 1320 of the second frame assembly 1300 by the threaded bolt 1410 and nut 1408 and is positioned between the arms 1310 and 1320 by the spacers 1404 and 1406.

The cam assembly 1100 comprises a cam 1102, cam adjustment assembly 1120, cam adjustment pin 1112, and cam stop or follower 1154. The cam 1102 comprises a mounting opening 1106, a set of adjustment points 1104, a maximum closing depth edge or point 1108, and a minimum closing depth edge or point 1110. The cam 1102 may be an eccentric cam having a generally pear shape with a flattened edge. The cam 1102 may have a shape similar to a snail cam without the drop-off typical of a snail cam. The cam adjustment assembly 1120 comprises a biasing means 1122 (e.g., a coil spring), knob or handle 1126, and threaded bolt 1124 with nut 1128. The threaded bolt 1124 is positioned through the cam mount 1114 of the cam frame portion 1115 on the first arm 1310 of the second frame assembly 1300. When the handle 1126 is depressed towards the cam frame portion 1115, the cam 1102 is moved away from the cam frame portion 1115 and tension is relieved such that the cam 1102 may be disengaged from the cam adjustment pin 1112 and rotated by action on the handle 1126 to a different one of the set of adjustment points 1104. In this manner, the cam 1102 may be rotated or adjusted between a maximum depth point 1108 and a minimum depth point 1110. The edge of the cam 1102 facing the first frame assembly 1200 abuts and is stopped by the cam stop or follower 1154 which is connected to the plate 1210 by the cam stop arm 1150.

Figure 4:
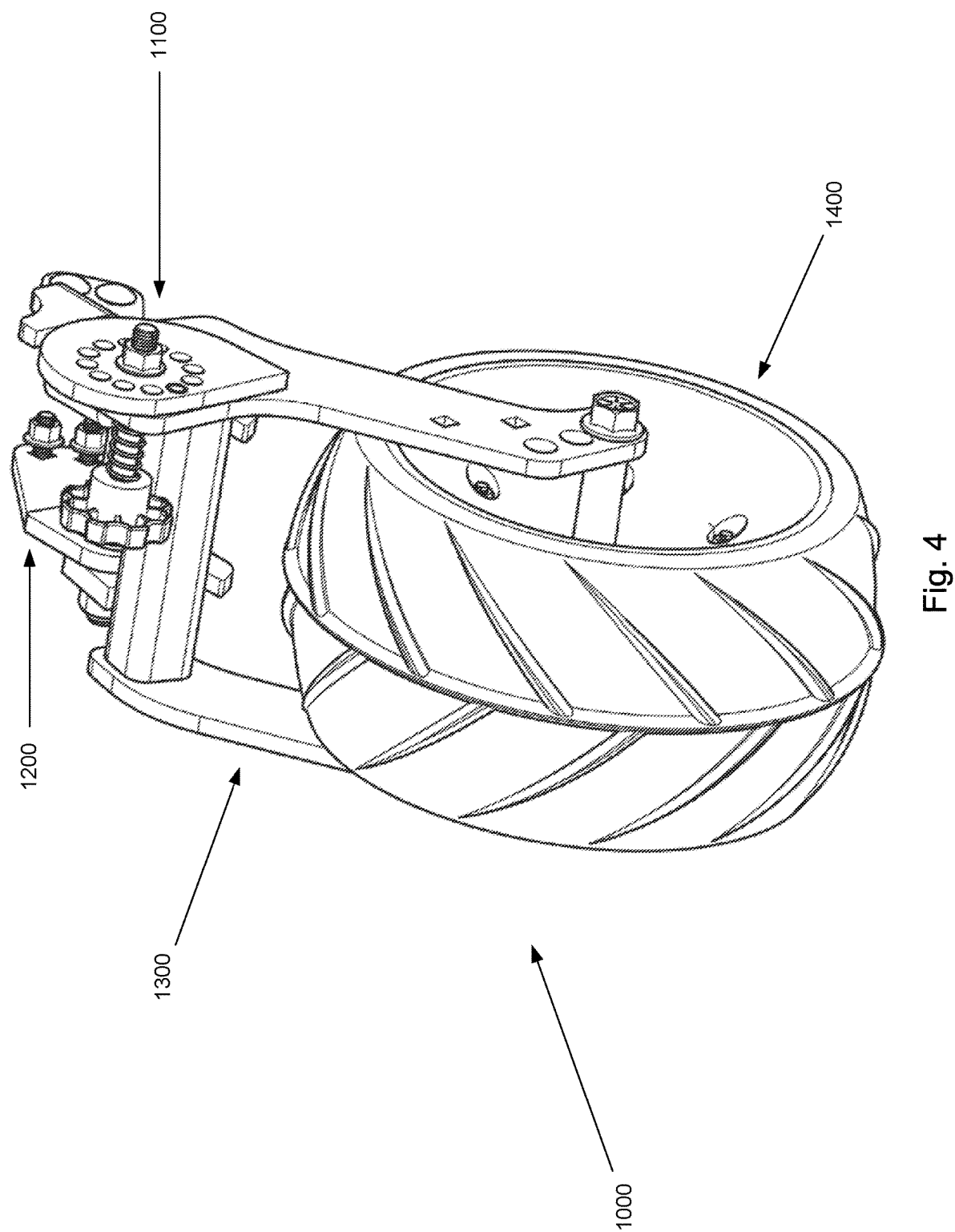
Figure 5:
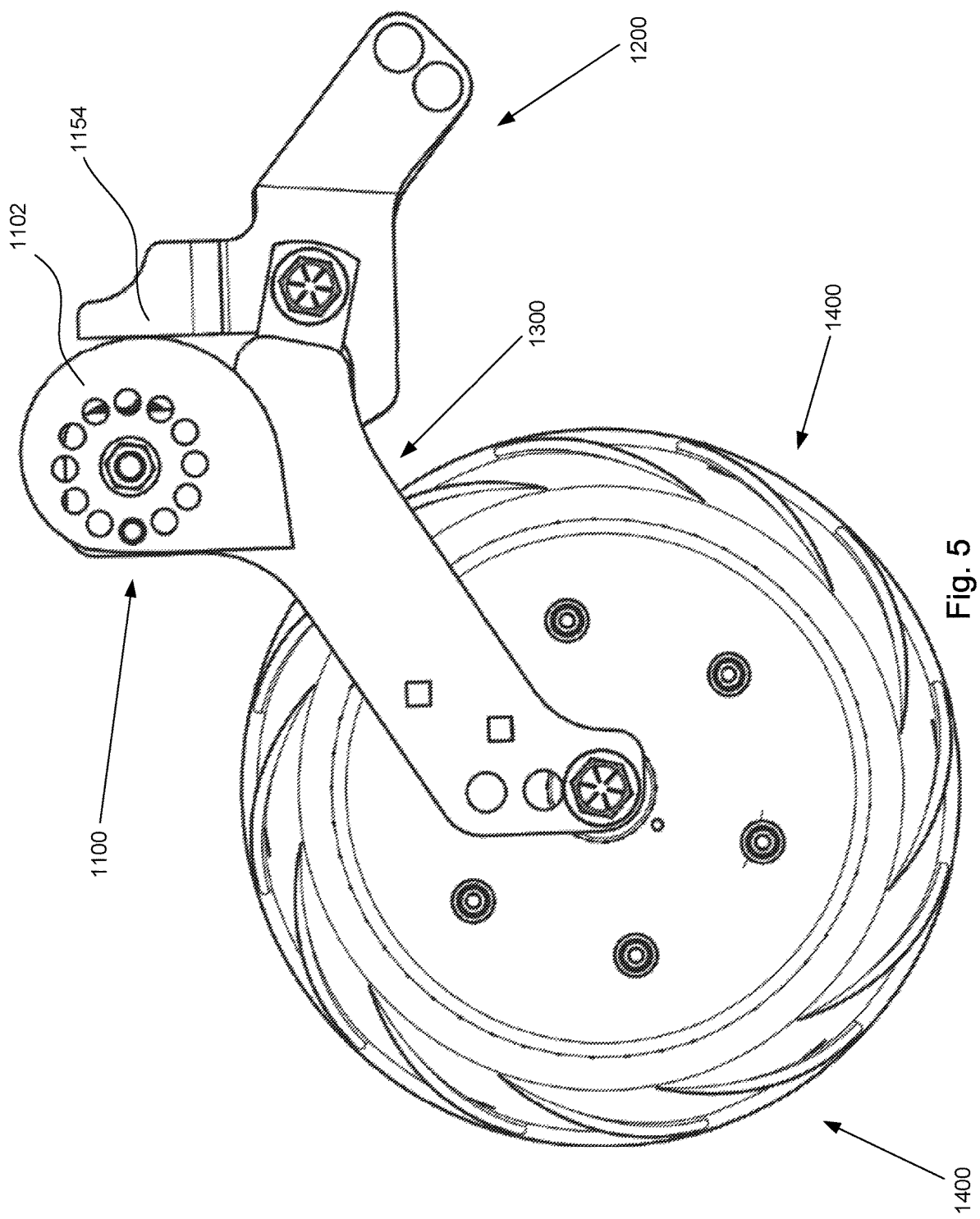
Figure 6:
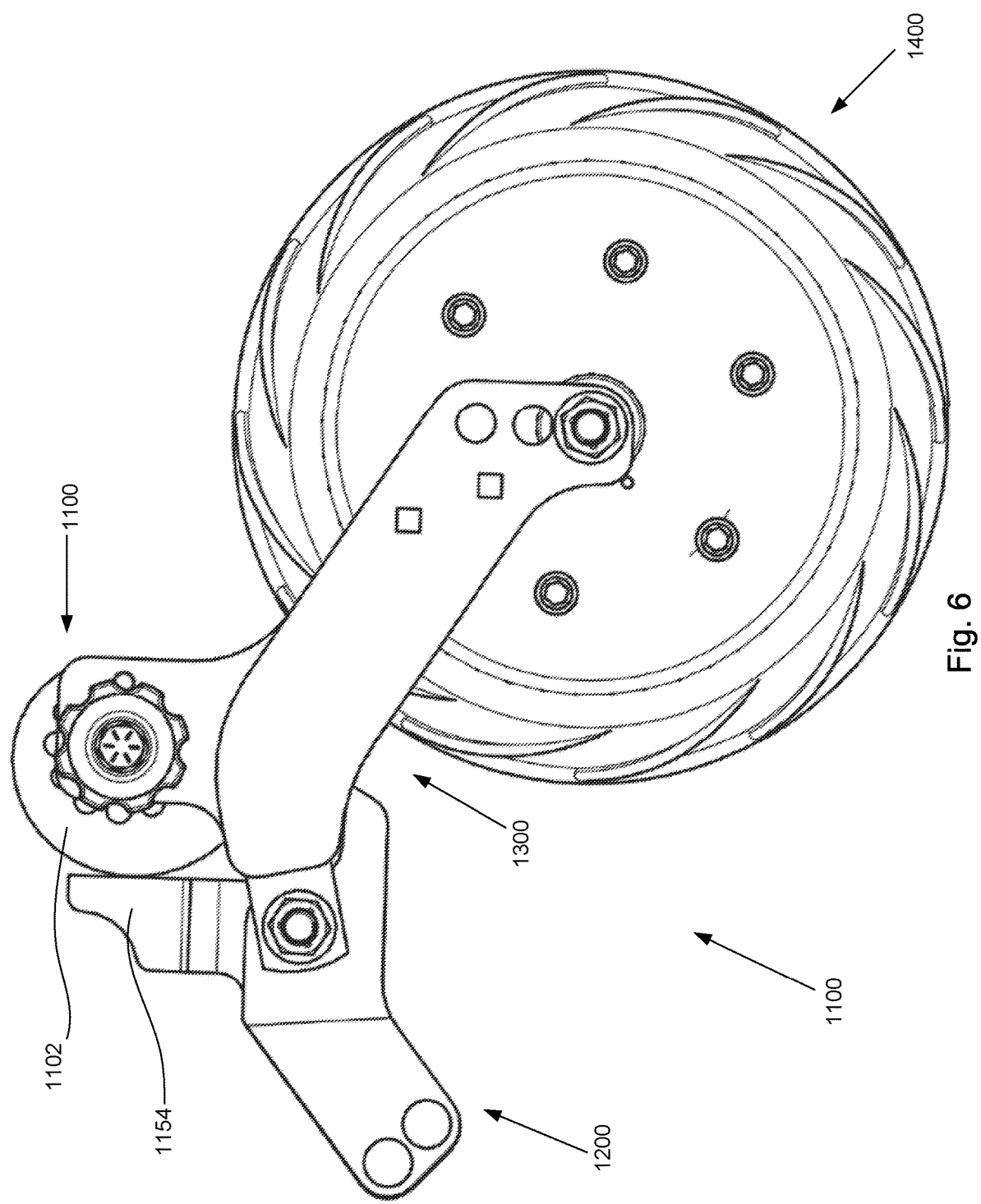
Figure 7:
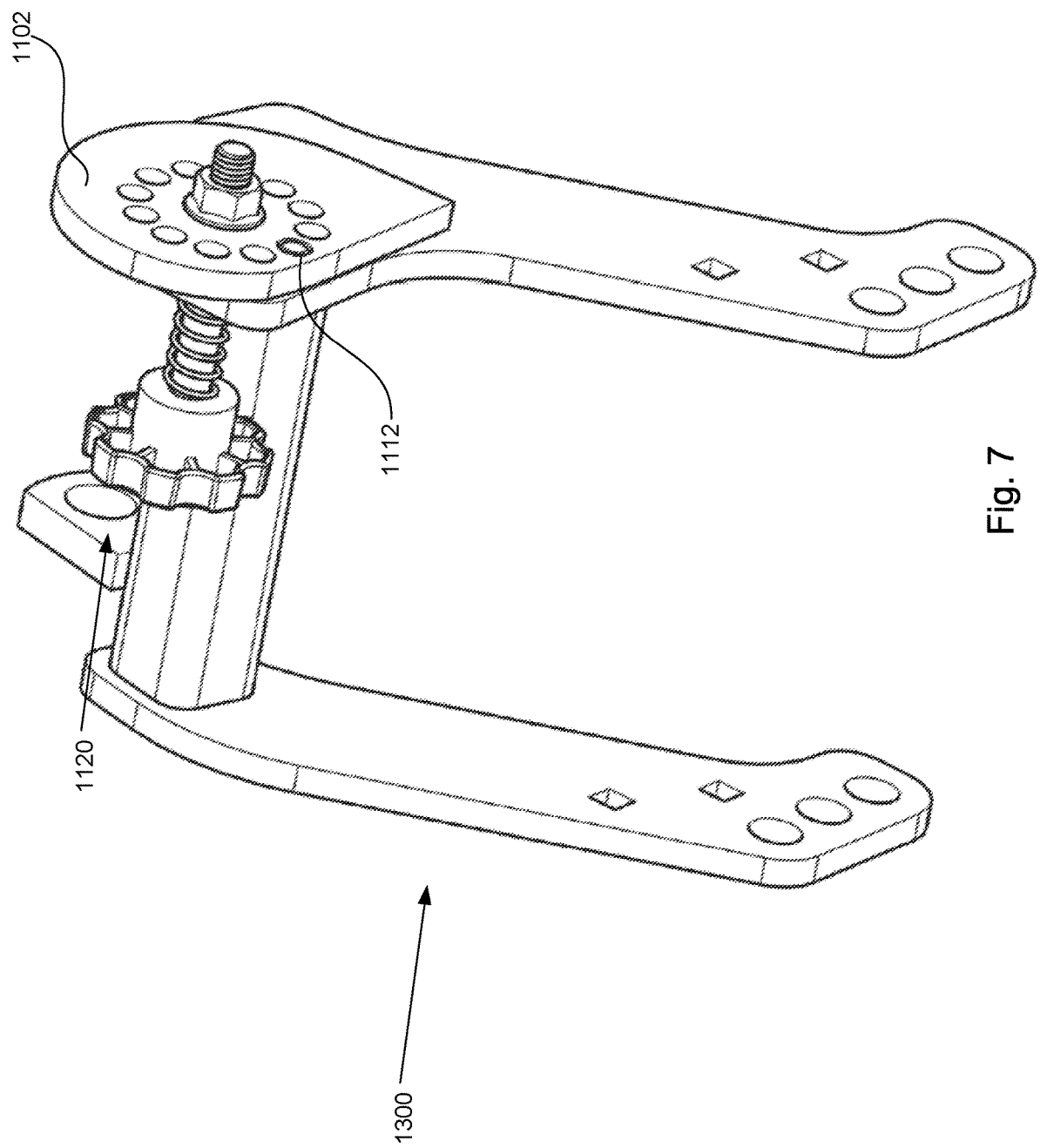

FIG. 4 provides an isometric view of the second stage closing unit 1000 comprising the cam assembly 1100, the first frame assembly 1200, second frame assembly 1300, and wheel assembly 1400. FIG. 5 provides a left side view of the second stage closing unit 1000 comprising the cam assembly 1100, the first frame assembly 1200, second frame assembly 1300, and wheel assembly 1400. FIG. 6 provides a right side view of the second stage closing unit 1000 comprising the cam assembly 1100, the first frame assembly 1200, second frame assembly 1300, and wheel assembly 1400. FIG. 7 provides an isometric view of the second frame assembly 1300 showing in greater detail the cam 1102 engaged with the cam adjustment pin 1112 and the cam adjustment assembly 1120.

When the wheel assembly 1400 and second frame assembly 1300 are moved upwards by rotating about a center at the support 1230, the cam 1102 sets an upper limit on this rotation. When the cam 1102 abuts the cam stop 1154, down pressure or force exerted by the first stage row closing assembly 3100 is transferred to the wheel assembly 1400 through the first 1200 and second 1300 frame assemblies. The second stage closing assembly 1000 is effectively "locked" or rigid with respect to the first stage closing assembly 3100 and will travel with and provide a depth stop or limit to the first stage closing assembly 3100 when the cam 1102 abuts the cam stop 1154. This sets a limit as to how deep the closing wheels of the first stage closing assembly 3100 may engage with the soil and also sets a down pressure to be exerted by the wheel assembly 1400 of the second stage closing assembly 1000.

Various cam 1102 positions and levels of engagement 20 of the closing wheels for the first stage row closing assembly 3100 relative to a surface or soil level 10 shown without (FIGS. 8-11) and with (FIGS. 12-20) a furrowing unit 50 comprising a frame 52, coulter wheel 54, and furrowing wheel or furrower 56 are provided.

Figure 8:
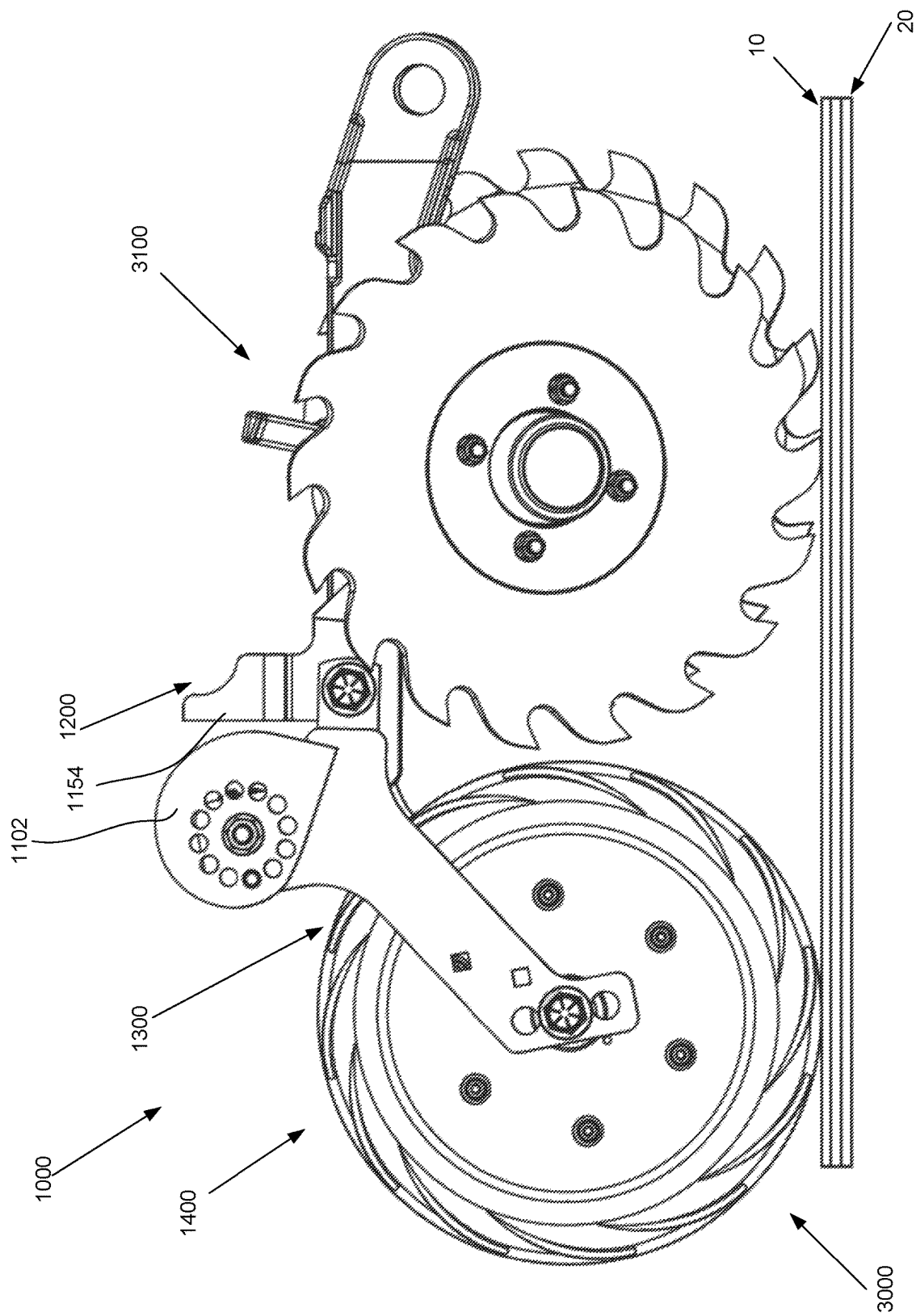
FIGS. 8-11 provide views of the level of soil engagement of a first stage row closing assembly based on a cam position or adjustment of the cam based depth limiter of the second stage row closing unit according to an embodiment of the present invention.

In FIG. 8, the two-stage row closing system 3000 is shown as it would appear when stopped, that is, when planting and row closing were not occurring. No load is placed on either the first stage row closing unit 3100 or second stage row closing unit 1000 and the cam 1102 is not engaged with the cam stop 1154. The row closing wheels of the first stage 3100 are sitting on the surface of the soil 10 and are not engaged below the soil 20.

Figure 9:
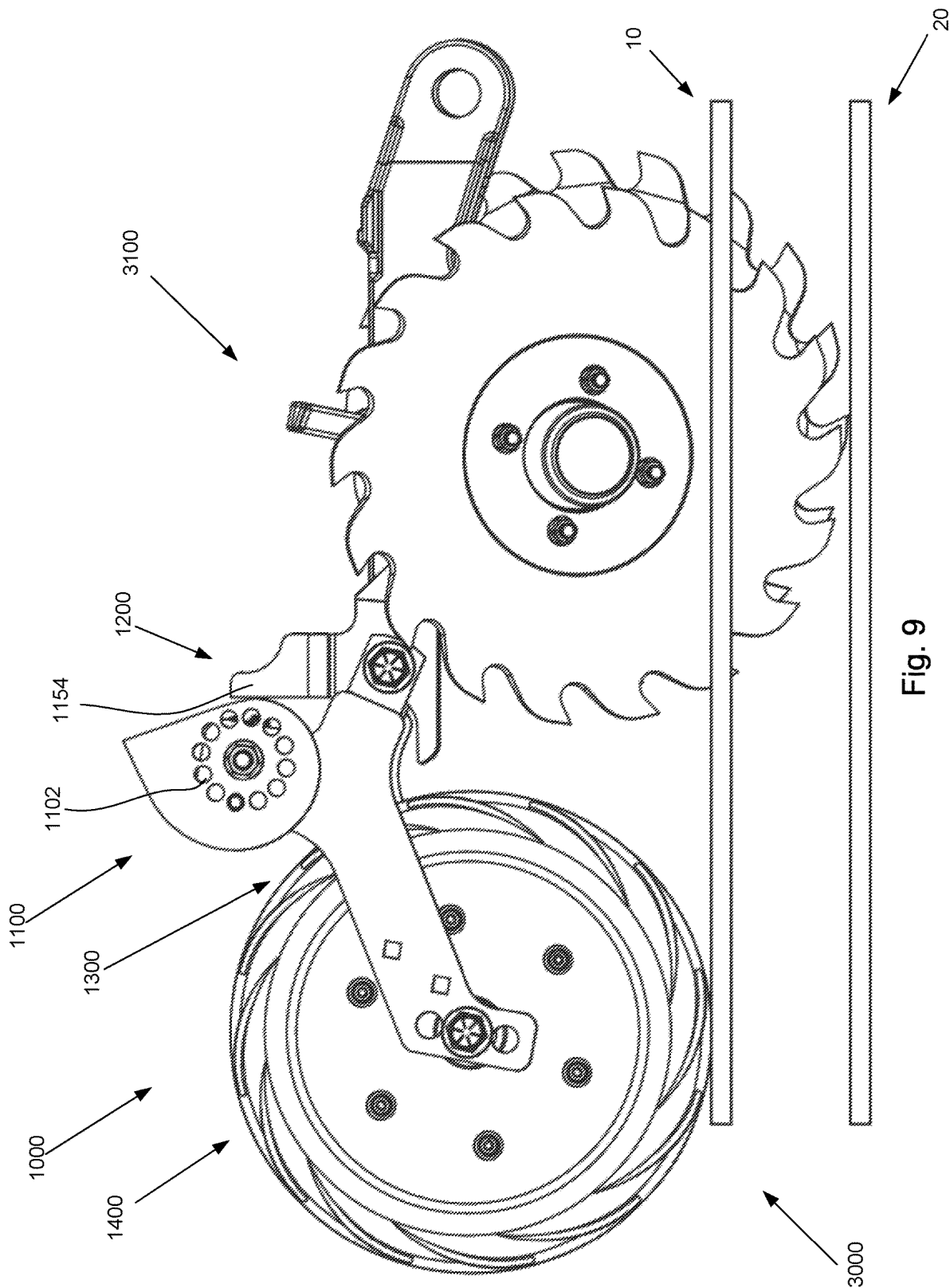

In FIG. 9, the two-stage row closing system 3000 is shown as it would appear in operation and the cam 1102 has been adjusted to a maximum closing depth setting. In this setting, the cam 1102 is engaged with the cam stop 1154 and the closing wheels of the first stage 3100 are engaged with the soil at depth 20 below the surface 10. The second stage closing assembly 1000 is acting as a depth stop or limit to the first stage closing assembly 3100 and is preventing the closing wheels of the first stage 3100 from further or more deeply engaging with the soil.

Figure 10:
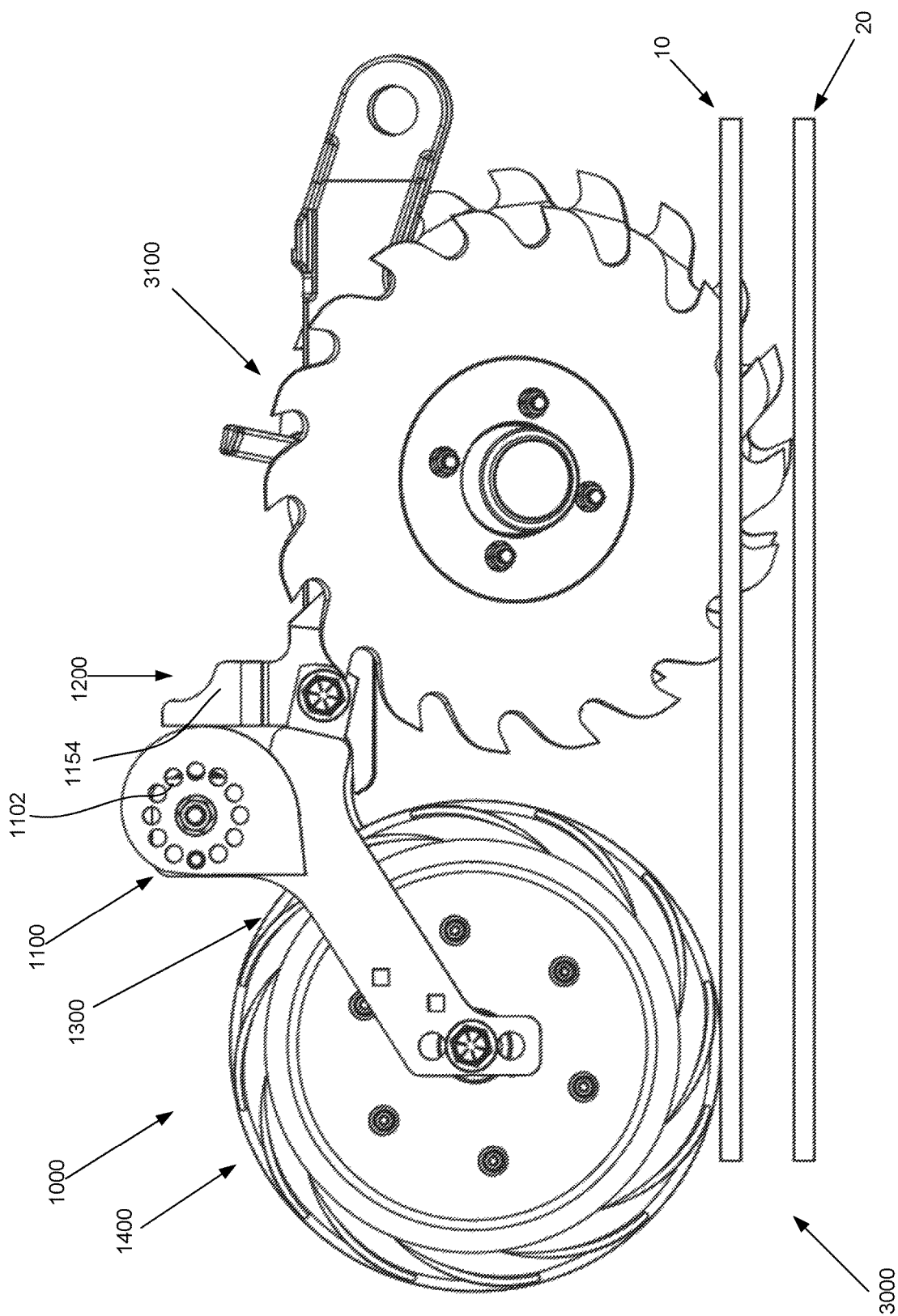

In FIG. 10, the two-stage row closing system 3000 is shown as it would appear in operation and the cam 1102 has been adjusted to a medium, middle, or moderate closing depth setting. In this setting, the cam 1102 is engaged with the cam stop 1154 and the closing wheels of the first stage 3100 are engaged with the soil at depth 20 below the surface 10. The second stage closing assembly 1000 is acting as a depth stop or limit to the first stage closing assembly 3100 and is preventing the closing wheels of the first stage 3100 from further or more deeply engaging with the soil.

Figure 11:
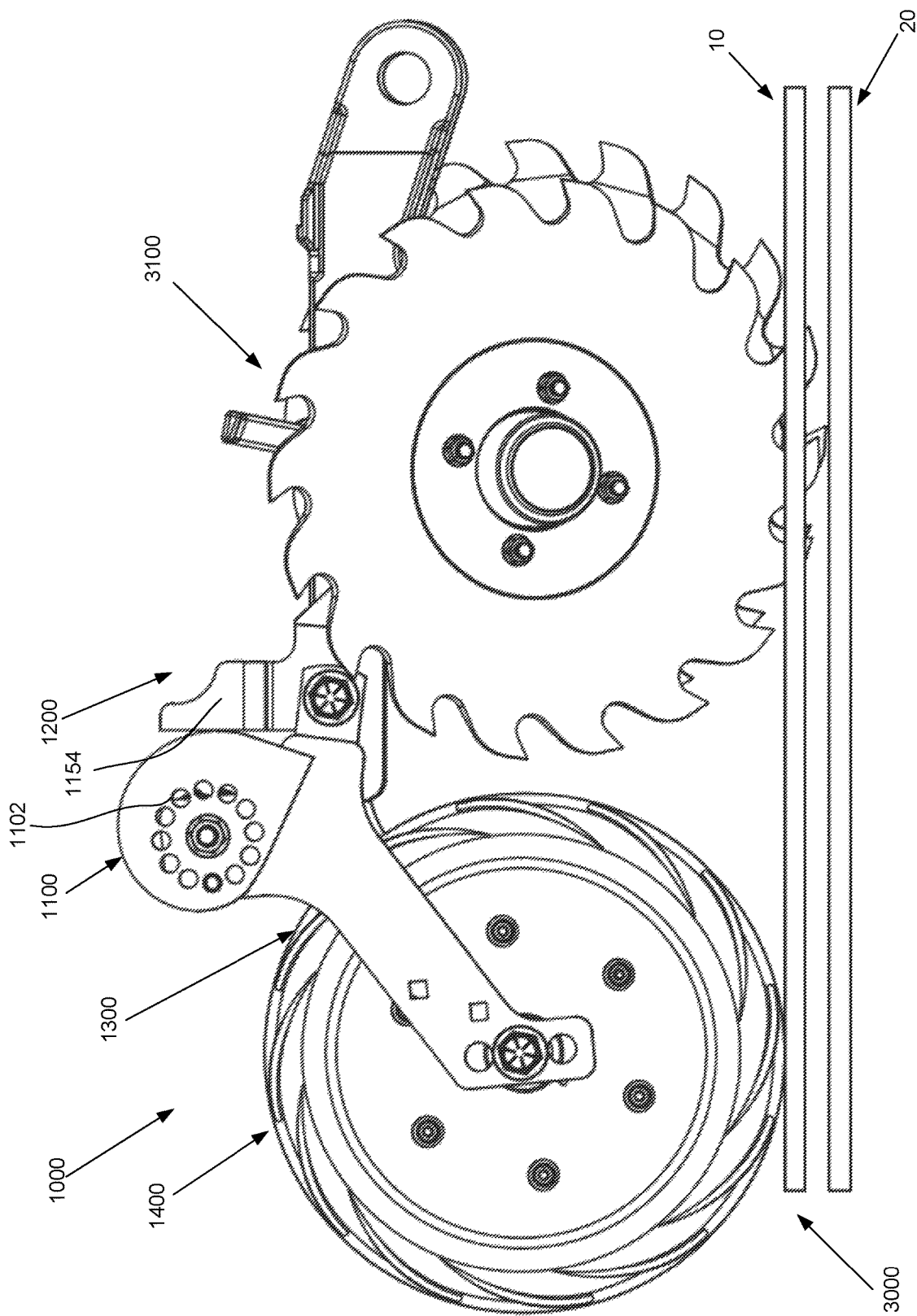
Figure 12:
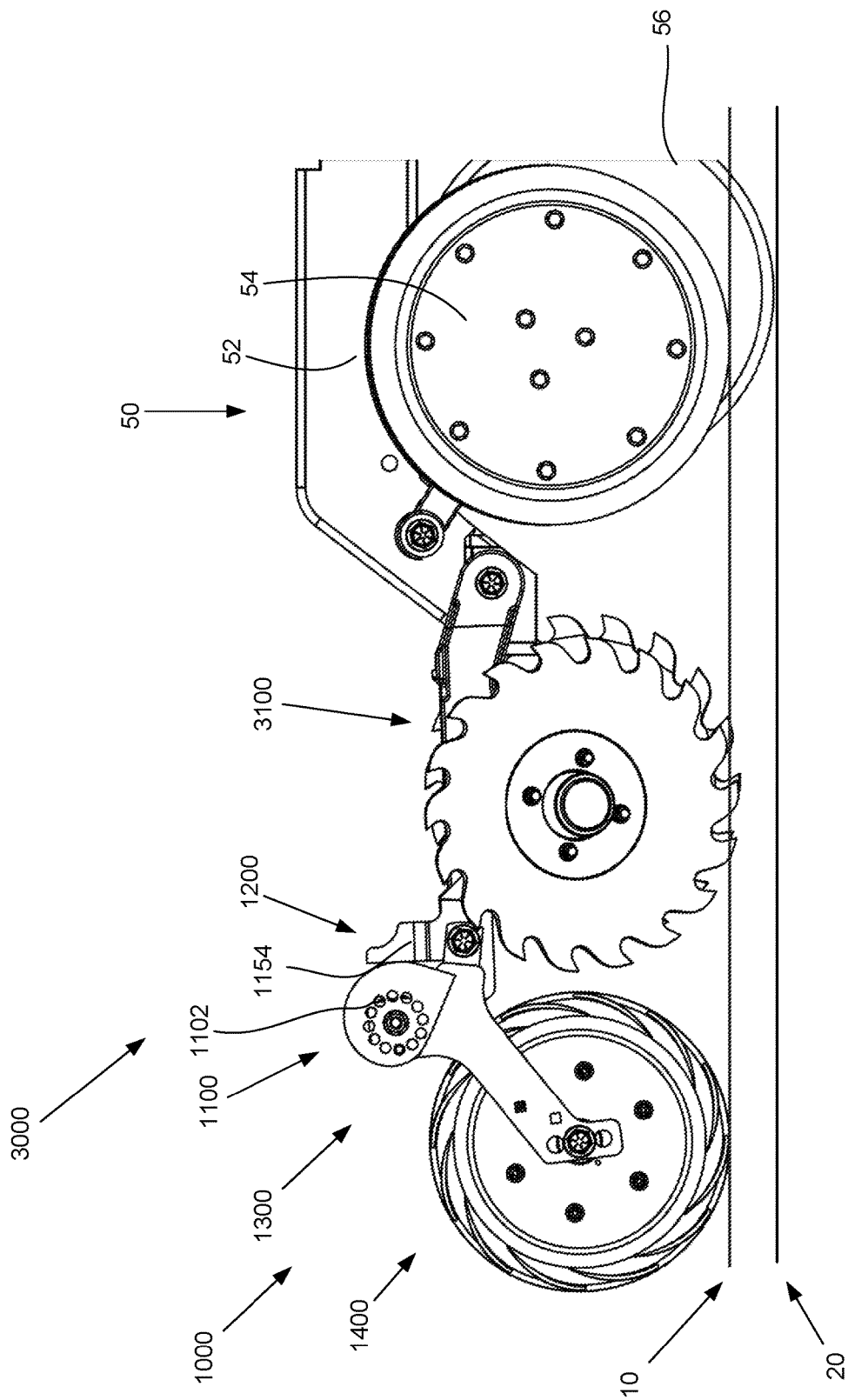
FIGS. 12-17 provide views of the level of soil engagement of a furrower on a row unit of a row planter and of the level of soil engagement of a first stage row closing assembly based on a cam position or adjustment of the cam based depth limiter of the second stage row closing unit according to an embodiment of the present invention.

In FIG. 11, the two-stage row closing system 3000 is shown as it would appear in operation and the cam 1102 has been adjusted to a minimum closing depth setting. In this setting, the cam 1102 is engaged with the cam stop 1154 and the closing wheels of the first stage 3100 are engaged with the soil at depth 20 below the surface 10. The second stage closing assembly 1000 is acting as a depth stop or limit to the first stage closing assembly 3100 and is preventing the closing wheels of the first stage 3100 from further or more deeply engaging with the soil.

With reference now to FIGS. 12-17, the two-stage row closing system 3000 is shown with the closing system raised and lowered relative to a furrowing unit 50 and at varying depth settings for the cam 1102. For example, in FIG. 12 the two-stage row closing system is shown as it would appear in operation and the cam 1102 has been adjusted to a minimum depth setting. In this setting, the two-stage row closing system 3000 is pivoted relatively "up" or is raised relative to the furrowing unit 50. The furrower 56 is engaged with the soil 10 at a maximum depth 20, and the gauge wheels 54 ride on the surface of the soil 10. The wheel assembly 1400 and second stage closing unit 1000 prevent further engagement of the closing wheels of the first stage closing unit 3100 with the soil 10 with the cam 1102 and cam stop 1154 providing for the second stage closing unit 1000 to act as a depth stop for the first stage closing unit 3100.

Figure 13:
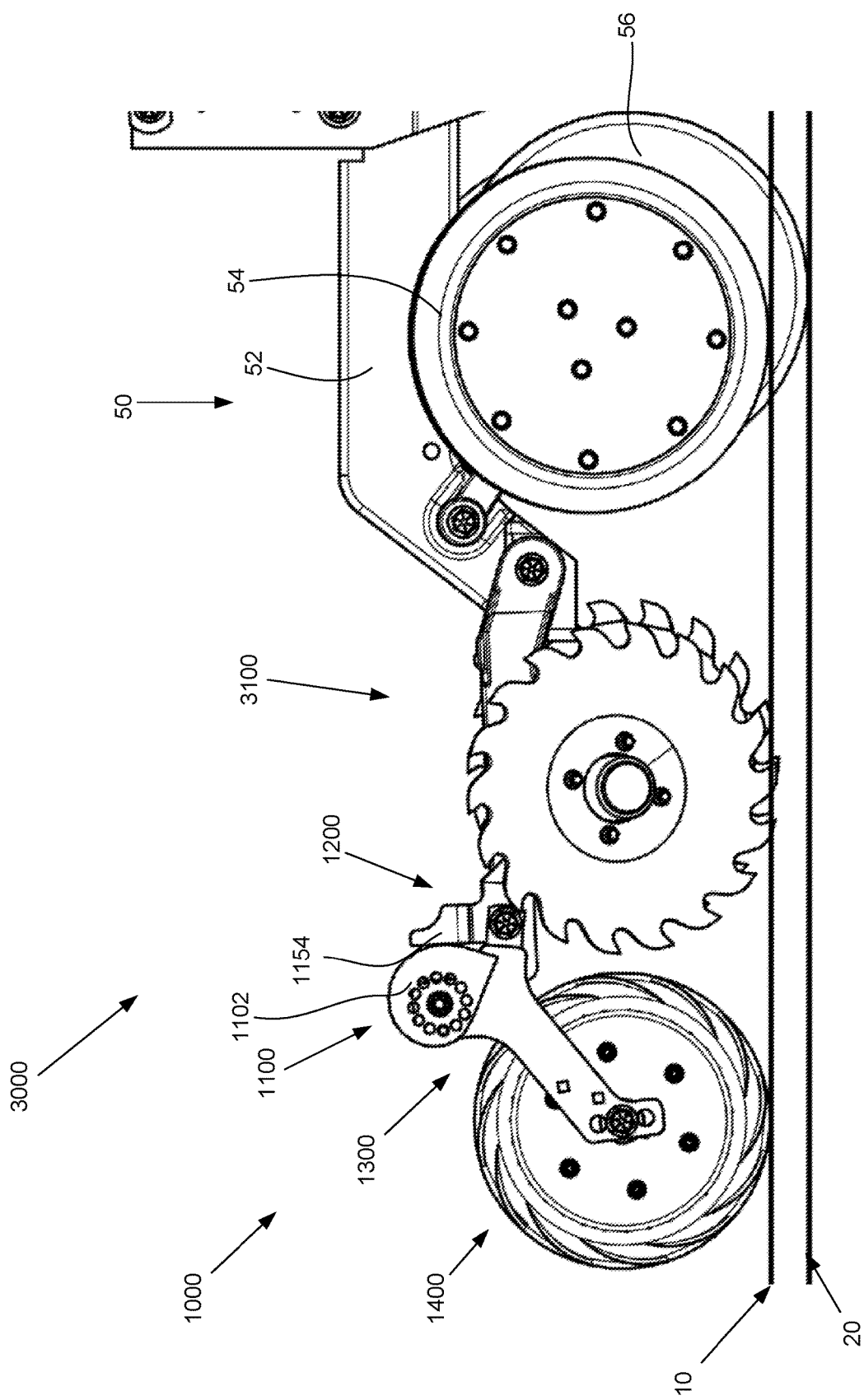

In FIG. 13 the two-stage row closing system is shown as it would appear in operation and the cam 1102 has been adjusted to a minimum depth setting. In this setting, the two-stage row closing system 3000 is pivoted relatively "down" or is lowered relative to the furrowing unit 50. The furrower 56 is engaged with the soil 10 at a relatively lower depth 20, and the gauge wheels 54 ride on the surface of the soil 10. The wheel assembly 1400 and second stage closing unit 1000 prevent further engagement of the closing wheels of the first stage closing unit 3100 with the soil 10 with the cam 1102 and cam stop 1154 providing for the second stage closing unit 1000 to act as a depth stop for the first stage closing unit 3100.

Figure 14:
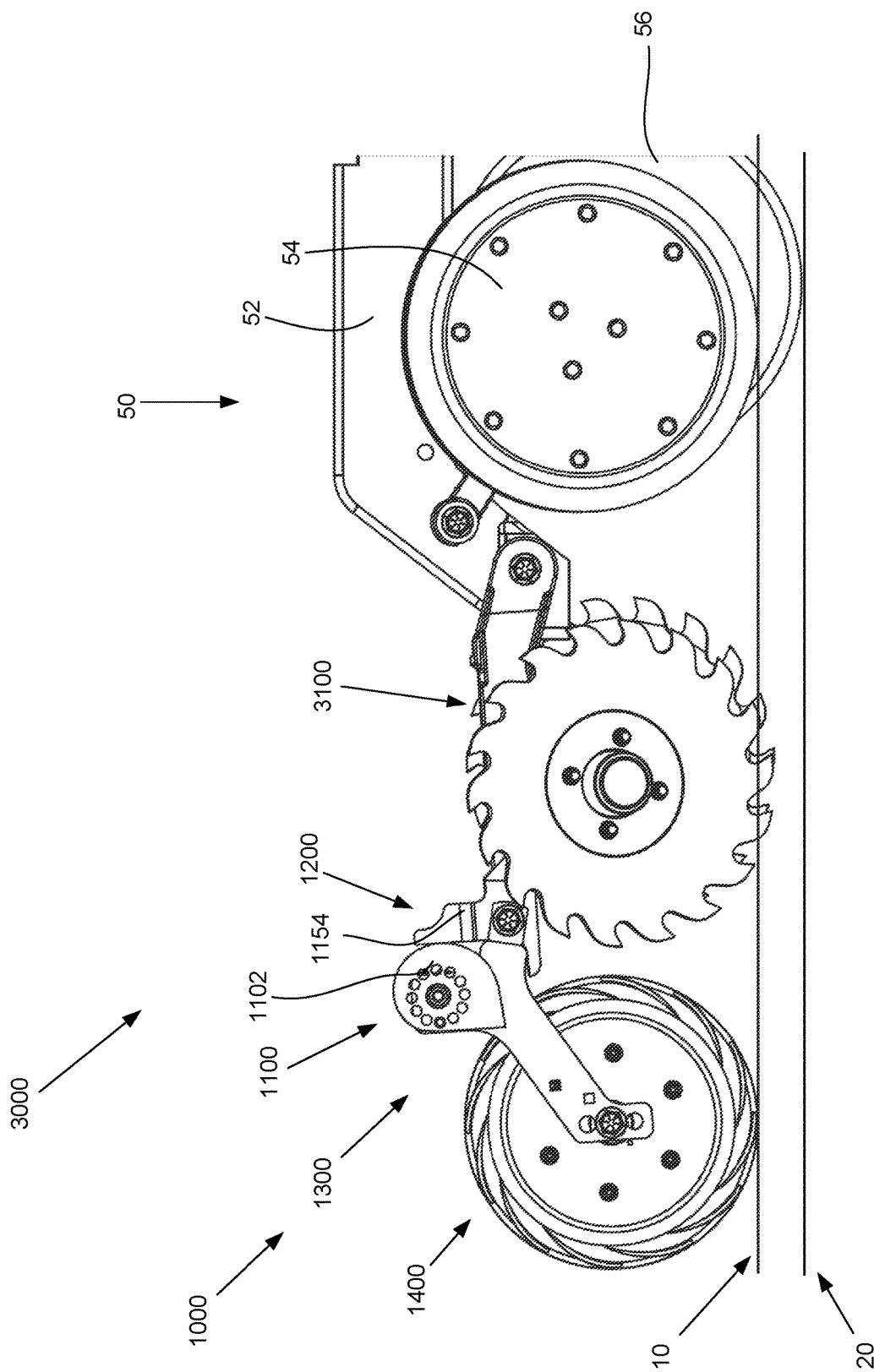

In FIG. 14 the two-stage row closing system is shown as it would appear in operation and the cam 1102 has been adjusted to a moderate depth setting. As shown, the two-stage row closing system 3000 is pivoted relatively "up" or is raised relative to the furrowing unit 50. The furrower 56 is engaged with the soil 10 at a maximum depth 20, and the gauge wheels 54 ride on the surface of the soil 10. The wheel assembly 1400 and second stage closing unit 1000 prevent further engagement of the closing wheels of the first stage closing unit 3100 with the soil 10. The cam 1102 and cam stop 1154 provide for the second stage closing unit 1000 to act as a depth stop for the first stage closing unit 3100.

Figure 15:
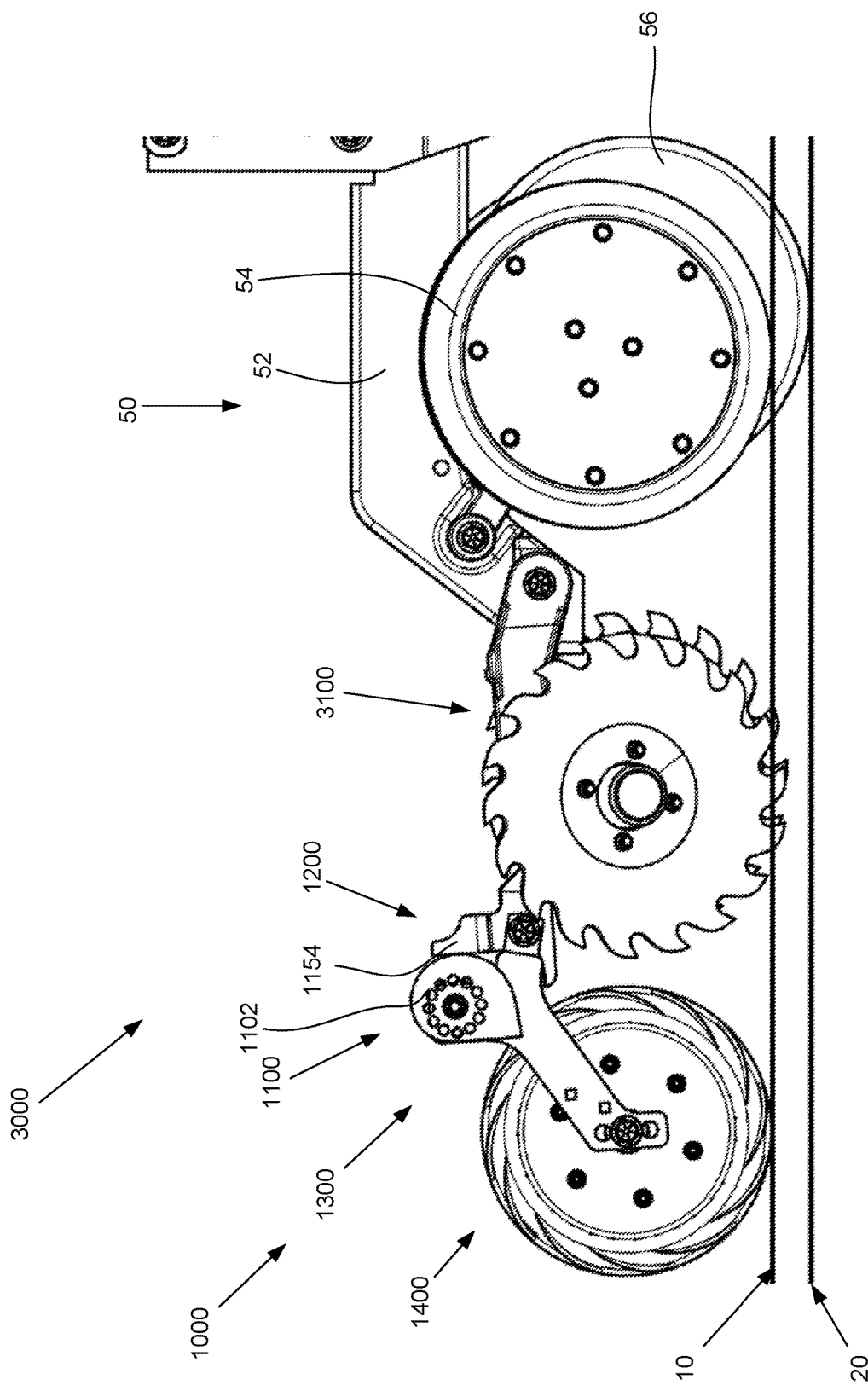

In FIG. 15 the two-stage row closing system is shown as it would appear in operation and the cam 1102 has been adjusted to a moderate depth setting. As shown, the two-stage row closing system 3000 is pivoted relatively "down" or is lowered relative to the furrowing unit 50. The furrower 56 is engaged with the soil 10 at a relatively lower depth 20, and the gauge wheels 54 ride on the surface of the soil 10. The wheel assembly 1400 and second stage closing unit 1000 prevent further engagement of the closing wheels of the first stage closing unit 3100 with the soil 10. The cam 1102 and cam stop 1154 provide for the second stage closing unit 1000 to act as a depth stop for the first stage closing unit 3100.

Figure 16:
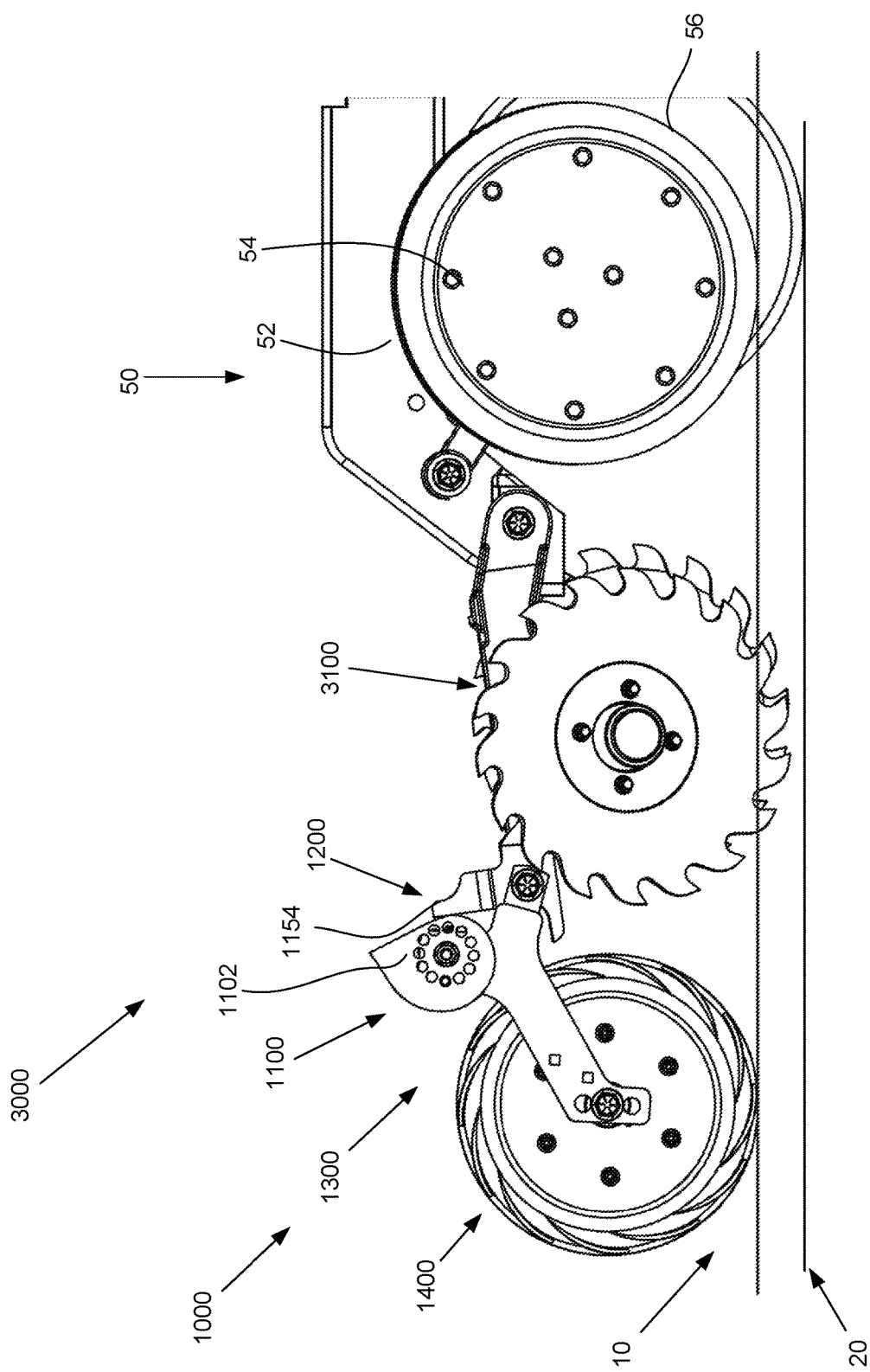

In FIG. 16 the two-stage row closing system is shown as it would appear in operation and the cam 1102 has been adjusted to a maximum depth setting. As shown, the two-stage row closing system 3000 is pivoted relatively "up" or is raised relative to the furrowing unit 50. The furrower 56 is engaged with the soil 10 at a maximum depth 20, and the gauge wheels 54 ride on the surface of the soil 10. The wheel assembly 1400 and second stage closing unit 1000 prevent further engagement of the closing wheels of the first stage closing unit 3100 with the soil 10. The cam 1102 and cam stop 1154 provide for the second stage closing unit 1000 to act as a depth stop for the first stage closing unit 3100.

Figure 17:
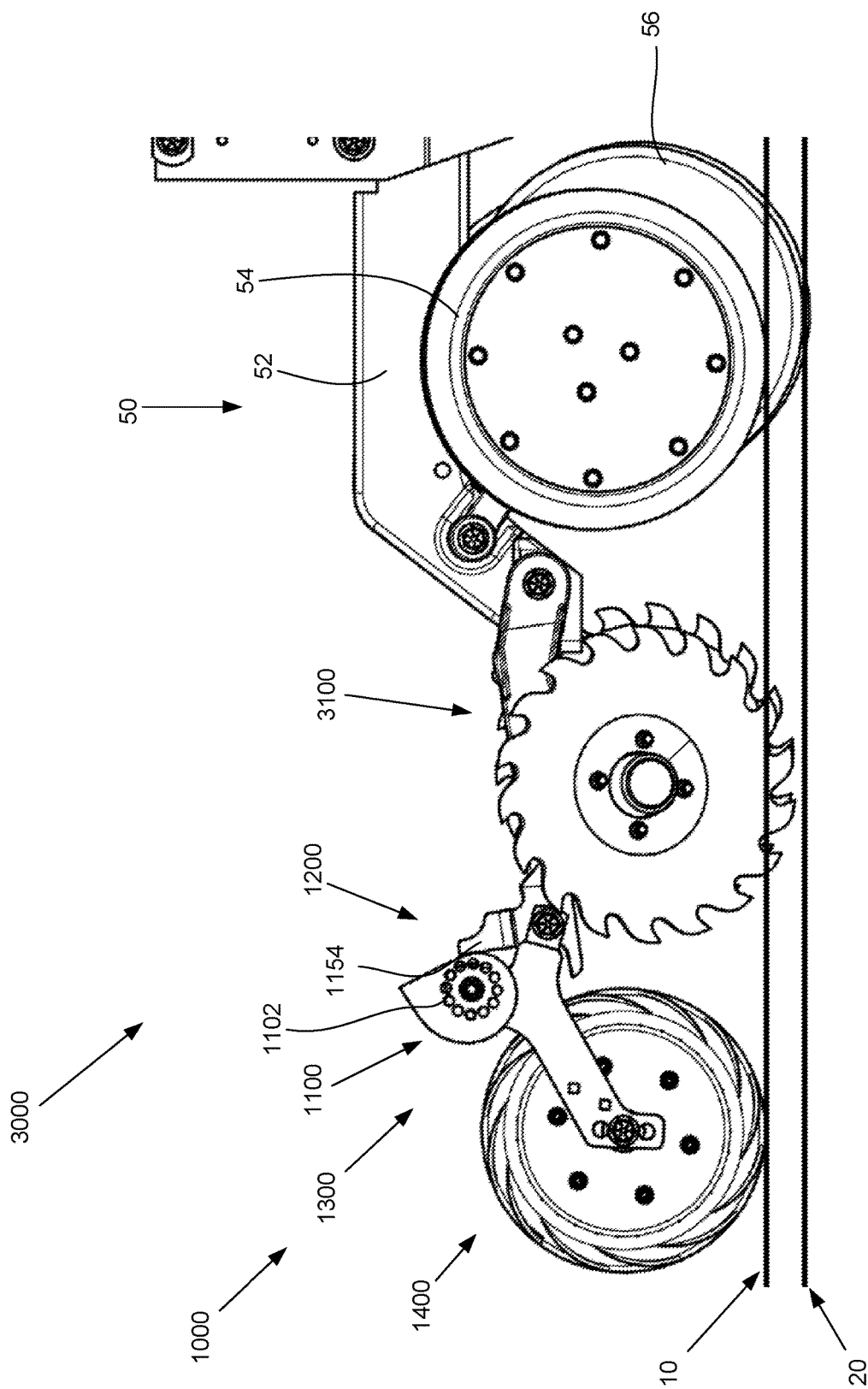

In FIG. 17 the two-stage row closing system is shown as it would appear in operation and the cam 1102 has been adjusted to a maximum depth setting. As shown, the two-stage row closing system 3000 is pivoted relatively "down" or is lowered relative to the furrowing unit 50. The furrower 56 is engaged with the soil 10 at a relatively lower depth 20, and the gauge wheels 54 ride on the surface of the soil 10. The wheel assembly 1400 and second stage closing unit 1000 prevent further engagement of the closing wheels of the first stage closing unit 3100 with the soil 10. The cam 1102 and cam stop 1154 provide for the second stage closing unit 1000 to act as a depth stop for the first stage closing unit 3100.

Figure 18:
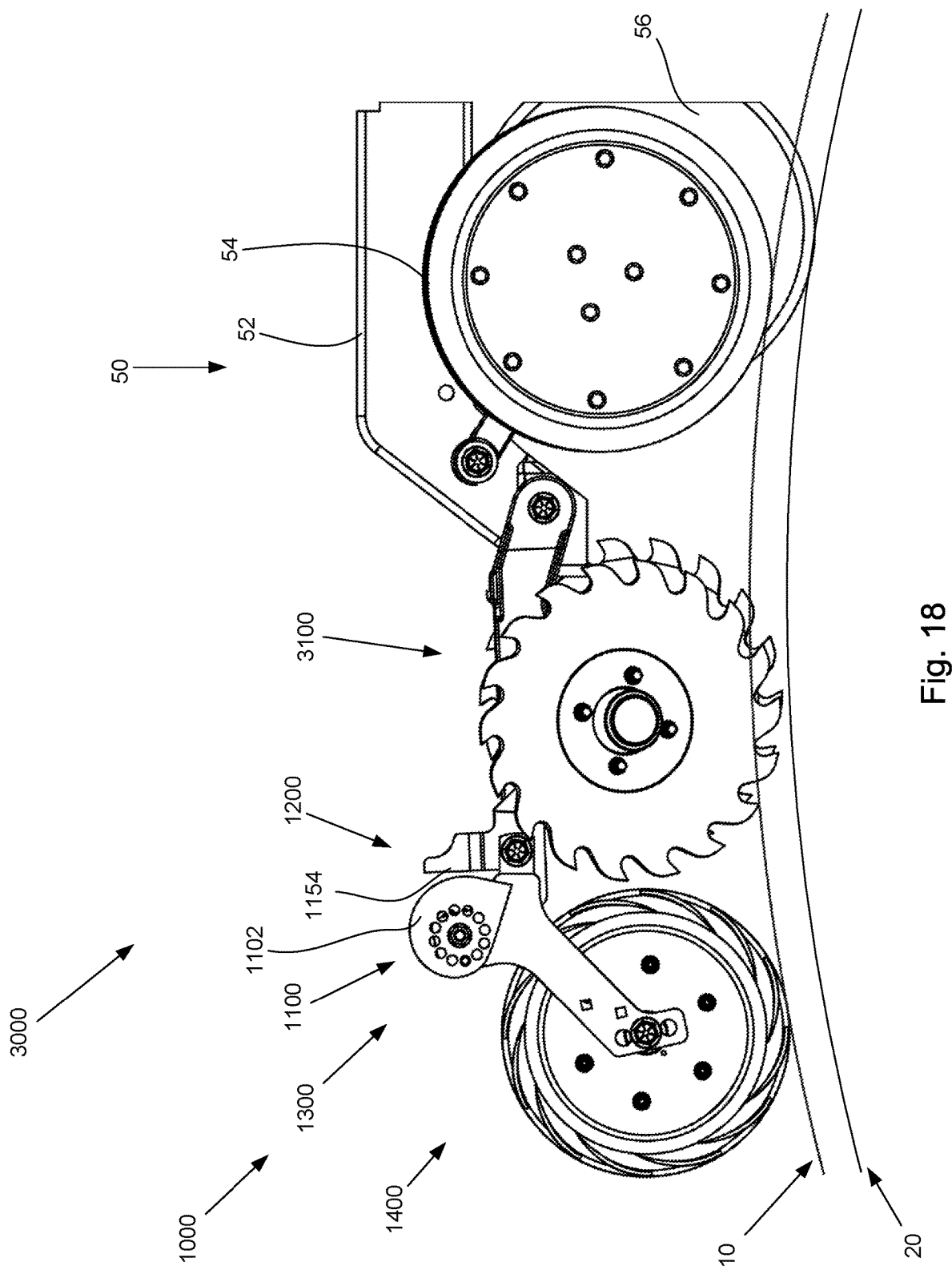
FIGS. 18-20 provide views of the level of soil engagement of a furrower on a row unit of a row planter and of the level of soil engagement of a first stage row closing assembly based on a cam position or adjustment of the cam based depth limiter of the second stage row closing unit as the row unit and row closing unit traverse a hill or rise of the soil surface according to an embodiment of the present invention.
Figure 19:
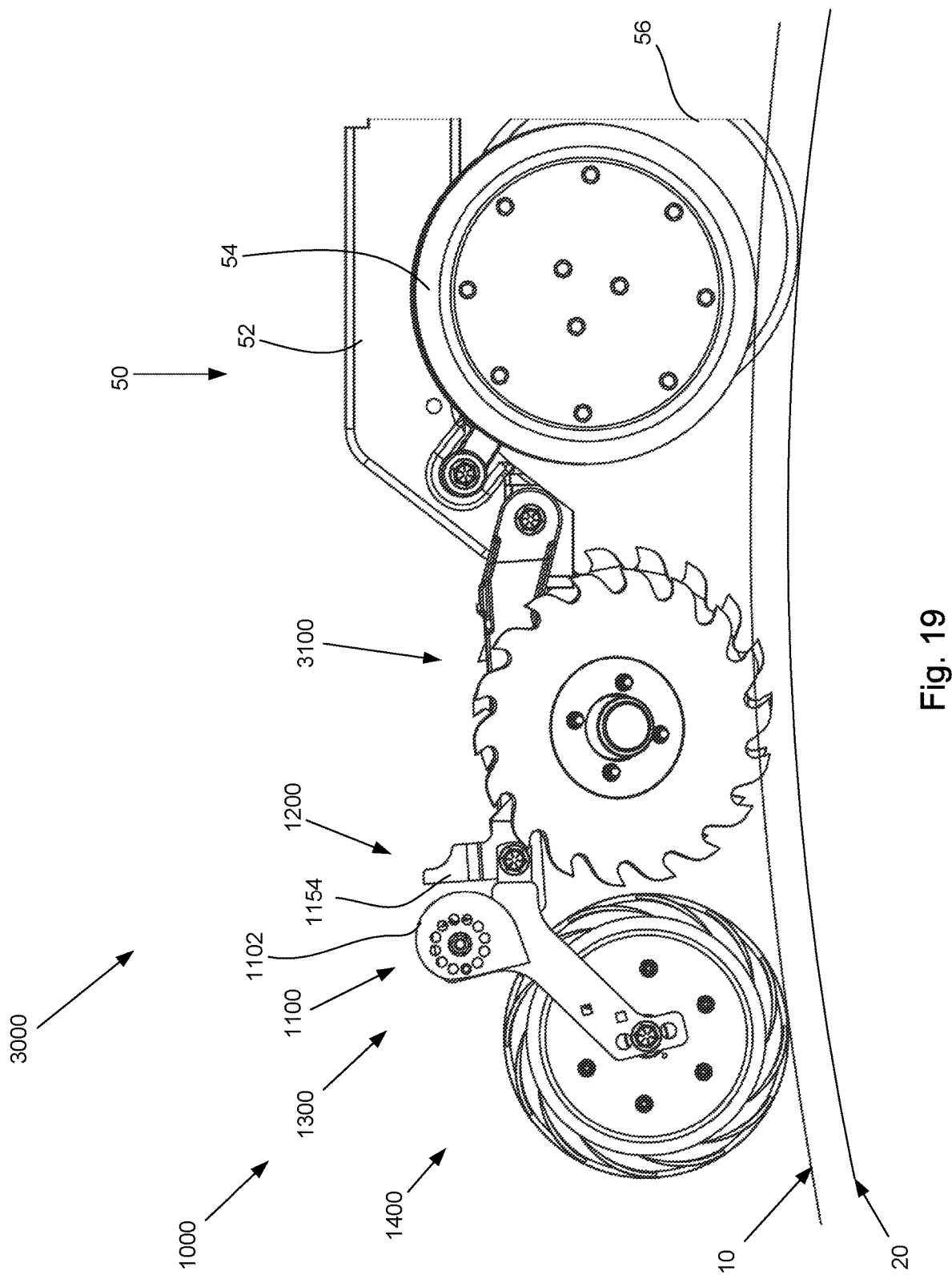
Figure 20:
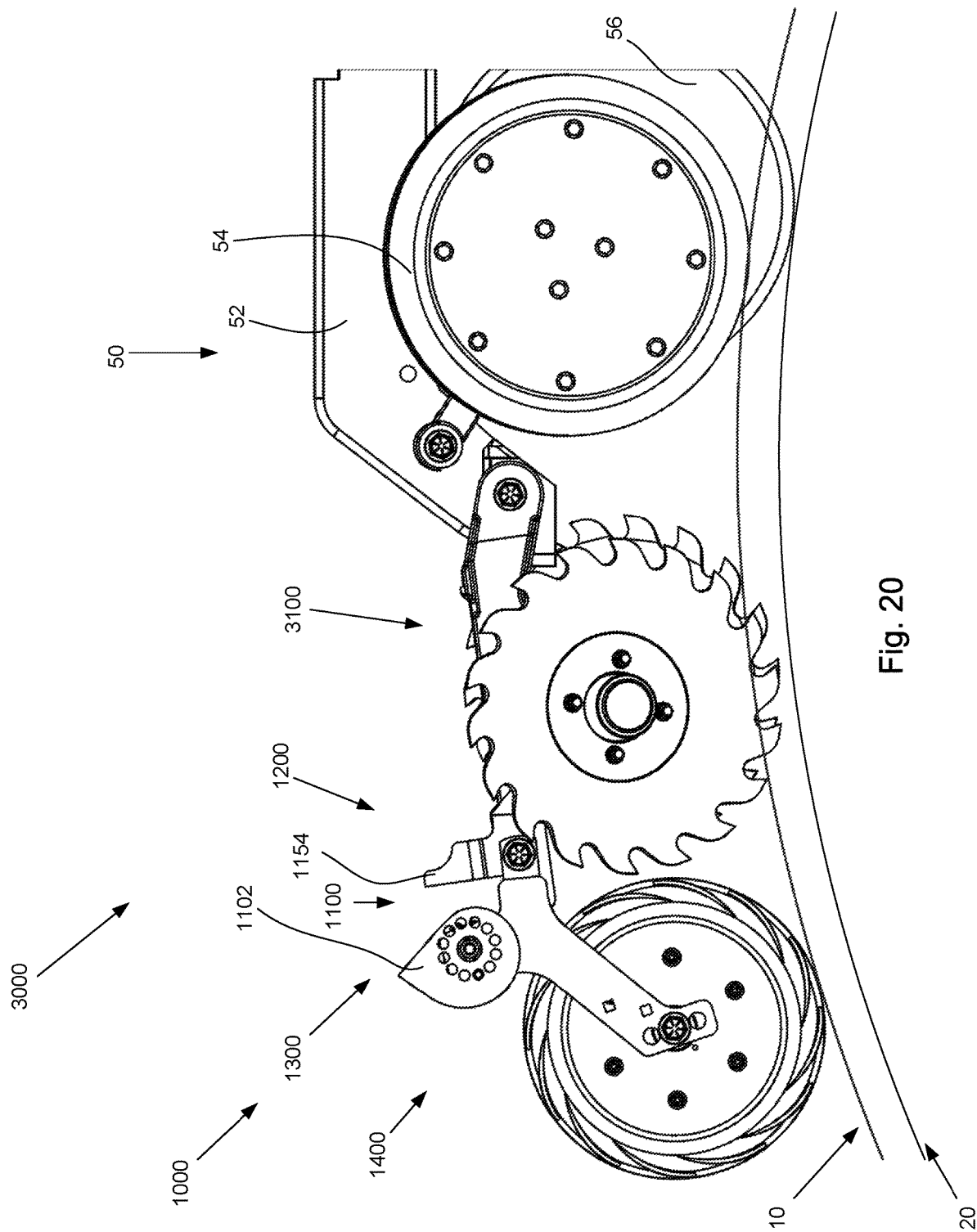

With reference now to FIGS. 18-20, the two-stage row closing system 3000 is shown with the closing system 3000 relative to a furrowing unit 50 as the furrowing unit 50 and the first stage row closing unit 3100 traverse a hill or rise of the surface of the soil 10 as the second stage closing unit 1000 trails behind and pivots or move independently of the first stage row closing unit 3100 and at varying depth settings for the cam 1102. In FIGS. 18-20, the planter wing or arm is lowered in a down position. For example, in FIG. 18 the two-stage row closing system is shown as it would appear in operation and the cam 1102 has been adjusted to a minimum depth setting. As shown in FIG. 18, as the furrowing unit 50 passes over the crest of the rise of the soil 18 the gauge wheels 54 remain on the surface of the soil 10 and the furrower 56 remains engaged at the engagement depth 20. The closing wheels of the first stage row closing unit 3100 remain engaged at the proper closing depth, and the first stage row closing unit 3100 is permitted to pivot upwards over the crest of the rise in the soil 10 with the furrowing unit 50. The second stage closing unit 1000 is able to pivot independently of the first stage row closing unit 3100 and the cam 1102 is not engaged with the cam stop 1154 whereby the second stage row closing unit 1000 is not "locked" with first stage the row closing unit 3100. This prevents excessive down pressure from being exerted on the first stage row closing unit 3100 by the second stage row closing unit 1000 which might cause improper closure of the furrow and possible damage to the planted seed.

In FIG. 19 the two-stage row closing system is shown as it would appear in operation and the cam 1102 has been adjusted to a moderate depth setting. As shown in FIG. 19, as the furrowing unit 50 passes over the crest of the rise of the soil 18 the gauge wheels 54 remain on the surface of the soil 10 and the furrower 56 remains engaged at the engagement depth 20. The closing wheels of the first stage row closing unit 3100 remain engaged at the proper, relatively lower, closing depth, and the first stage row closing unit 3100 is permitted to pivot upwards over the crest of the rise in the soil 10 with the furrowing unit 50. The second stage closing unit 1000 is able to pivot independently of the first stage row closing unit 3100 and the cam 1102 is not engaged with the cam stop 1154 whereby the second stage row closing unit 1000 is not "locked" with first stage the row closing unit 3100. This prevents excessive down pressure from being exerted on the first stage row closing unit 3100 by the second stage row closing unit 1000 which might cause improper closure of the furrow and possible damage to the planted seed.

In FIG. 20 the two-stage row closing system is shown as it would appear in operation and the cam 1102 has been adjusted to a maximum depth setting. As shown in FIG. 20, as the furrowing unit 50 passes over the crest of the rise of the soil 18 the gauge wheels 54 remain on the surface of the soil 10 and the furrower 56 remains engaged at the engagement depth 20. The closing wheels of the first stage row closing unit 3100 remain engaged at the proper, maximum closing depth, and the first stage row closing unit 3100 is permitted to pivot upwards over the crest of the rise in the soil 10 with the furrowing unit 50. The second stage closing unit 1000 is able to pivot independently of the first stage row closing unit 3100 and the cam 1102 is not engaged with the cam stop 1154 whereby the second stage row closing unit 1000 is not "locked" with first stage the row closing unit 3100. This prevents excessive down pressure from being exerted on the first stage row closing unit 3100 by the second stage row closing unit 1000 which might cause improper closure of the furrow and possible damage to the planted seed.

The two-stage closing system 3000 with the cam assembly 1100 provides a substantial improvement over existing closing systems. The second stage closing unit 1000 is secured to the first stage closing unit 3100 in an improved configuration that, using the cam assembly 1100, limits how far down or how deeply engaged the closing wheels of the first stage closing unit 3100 can be with the soil. The system 3000 can further transfer spring bias or air bag pressure from the first stage 3100 to the wheel assembly 1400 (e.g., third wheel, firming wheel, or second set of closing wheels). The firming wheel may be a single wheel or a pair of wheels, and the firming wheel may be toothed, spiked, or cogged, and may be made from steel, iron, plastic, or hardened rubber. The wheel may also have a hard or soft outer rubber layer that may assist in soil tamping in some soil conditions. The wheel assembly 1400 and cam assembly 1100 keep the closing wheels of the first stage 3100 from too deeply engaging with the soil. The cam 1102 is a depth limiter or depth adjustment for the closing wheels of the first stage 3100. The wheel assembly 1400 and second stage 1000 can become rigid with respect to the first stage 3100 and can transfer down pressure to the wheel assembly 1400 from the first stage 3100 through the first frame assembly 1200 and second frame assembly 1300.

The two-stage closing system 3000 can be used in a variety of till and no-till farming situations. For example, in a no-till farming system with loose soil conditions or when the ground is not firm, the cam 1102 can be set to allow the closing wheels to engage with the soil at the depth at which the closing wheels "want" to engage. In this situation a user would not want down pressure on the rear wheel (wheel assembly 1400) and would prefer the rear wheel or firming wheel to roll along on top of the ground. As soil conditions changed and as the ground dried out, or in a tilled ground setting, the closing wheels of the first stage 3100 may try to engage the soil too deeply and depth limiting this engagement using the cam assembly 1100 of the second stage closing unit 1000 would be necessary. The cam 1102 would be set to limit how deep the closing wheels would engage and to increase or decrease the tamping pressure of the wheel assembly 1400.

When the cam 1102 is set to transfer weight and make the first stage 3100 and second stage 1000 "rigid" or "locked" the first stage 3100 is still able to freely move upwards relative to the second stage 1000 because the two may pivot independently of each other as the system 3000 is "hinged" in the middle at the connection of the first frame assembly 1200 and second frame assembly 1300 of the second stage closing unit 1000. For example, on a rolling or undulating surface the first stage 3100 can pick up the wheel assembly 1400 can the second stage 1000 can apply pressure on the first stage 3100. This enables the second stage 1000 with the cam assembly 1100 to transfer weight and limit how deep the closing wheels can go but it also provides for the semi-independent movement of the first stage 3100 and second stage 1000.

Existing closing systems may excessively crush or tamp the soil or seed trench, especially when the soil is wet. This may prevent a seed from properly germinating and sprouting. With the two-stage closing system 3000 and with closing wheels such as cupped closing wheels the seed trench or furrow is tightly squeezed together and is tamped down by the wheel assembly 1400. This provides for a better stand and earlier seed emergence and by squeezing the soil, air pockets are removed which improves seed and seedling growth.

In wet soil conditions the cam 1102 would be set to a minimum setting and the wheel assembly 1400 would ride on its own weight to prevent air pockets. In dry conditions or tilled situations it would not be desirable to have the closing wheels of the first stage 3100 engaging too deeply with the soil. In these conditions the cam 1102 would be set such that the closing wheels of the first stage 3100 would run at about an inch into the soil. The cam 1102 would lock the first stage 3100 and second stage 1000 together in the downward direction and would provide for apply a high amount of down pressure or force on the wheel assembly 1400.

In all applications, the first stage row closing unit 3100 primarily provides for the "row closing" action and the second stage row closing unit 1000 provides a "row finishing" action. This is preferred especially in drier conditions where the top surface of the soil needs to be finish and where more down pressure is important. In especially dry conditions a set of plastic spiked wheels may be used in place of the wheel assembly 1400 to tamp down and break up soil chunks.

There are many aftermarket closing wheel configurations that work well in certain regions or soil types or certain moisture levels. To date there is not a closing system available that works in a wide range of conditions and soil types. For example, parts of western Kentucky have a silt loam soil type that naturally drains very slowly and retains a higher moisture level. This silt loam soil type may not be well drained which may cause serious issues in closing a seed trench in higher moisture levels. In order to close a seed trench or furrow in this condition with a smooth rubber closing wheel or with a cast iron closing wheel, the planting date would have to be pushed back several weeks until the soil will crumble. This delayed planting date causes a significant yield reduction as corn planting dates should as early as possible. In order to plant in a timely manner tillage is necessary to dry and warn the soil. This region, western Kentucky, benefits from a two stage closing system that in the first stage breaks or squeezes the side wall of a seed trench or furrow together, and then in a second stage, with only its own weight or biased by a biasing mechanism, lightly tamps or finishes the top of the seed trench allowing excess moisture to escape as opposed to crushing high moisture soil around the seed causing delayed emergence if it emerges at all. Additionally, a light tamping followed by a drag chain, second stage wheel, or pair of plastic spikes without much down force, will gently reduce or eliminate air pockets around the seed. This method has proven to emerge seeds in some cases several days earlier and provides a rapid early rate of growth similar to conventional tillage methods. Alternatively, dry land regions such as some parts of the western corn belt such as Kansas, or in different soil types in any given region with drier soils, the soil needs to be tamped down with more down force sealing the soil surface conserving moisture. By adjusting the cam limiting the depth of the first stage the amount of down pressure transferred to the rear second stage press wheel this is easily accomplished. It is important to note that soil types in different regions vary greatly and one field may be crumbling nicely and the second stage can be used to press with more force above the seed sealing it and helping conserve moisture, while the next field in the same region may have excessive moisture and needs less tamping allowing excess moisture to escape.

Additionally, one or more sensors, such an angle or position sensor, may be used with the two-stage closing system 3000 to provide feedback and determine the position of the first 3100 and second 1000 stage closing units such that the depth of engagement could be adjusted manually or automatically. Alternatively, a load cell could be used to provide or measure the pressure at the cam to provide sensor feedback to a monitoring or control unit.

Figure 21:
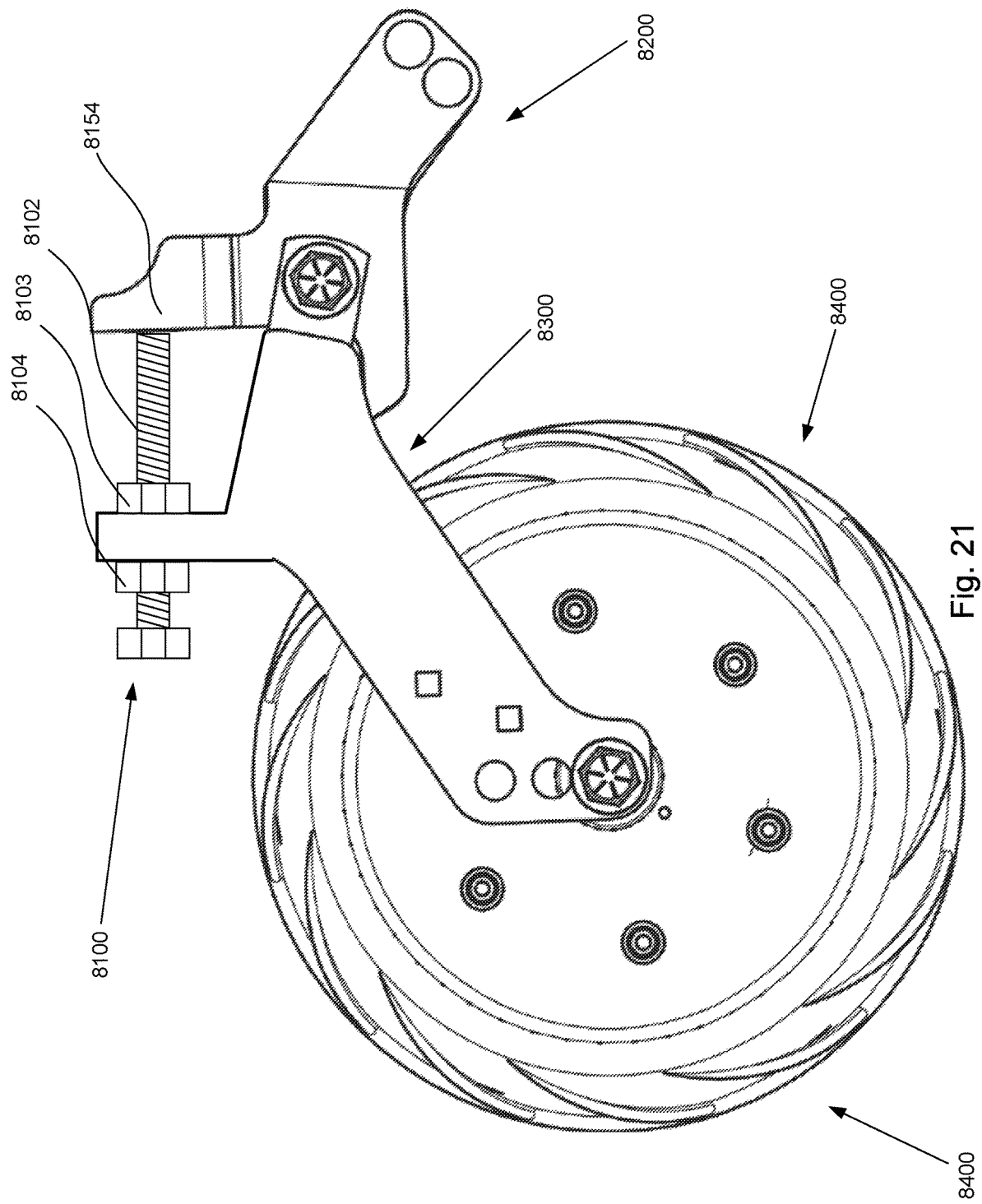
FIG. 21 provides a side view of a second stage row closing assembly with a threaded bolt depth limiting assembly according to an embodiment of the present invention.
Figure 22:
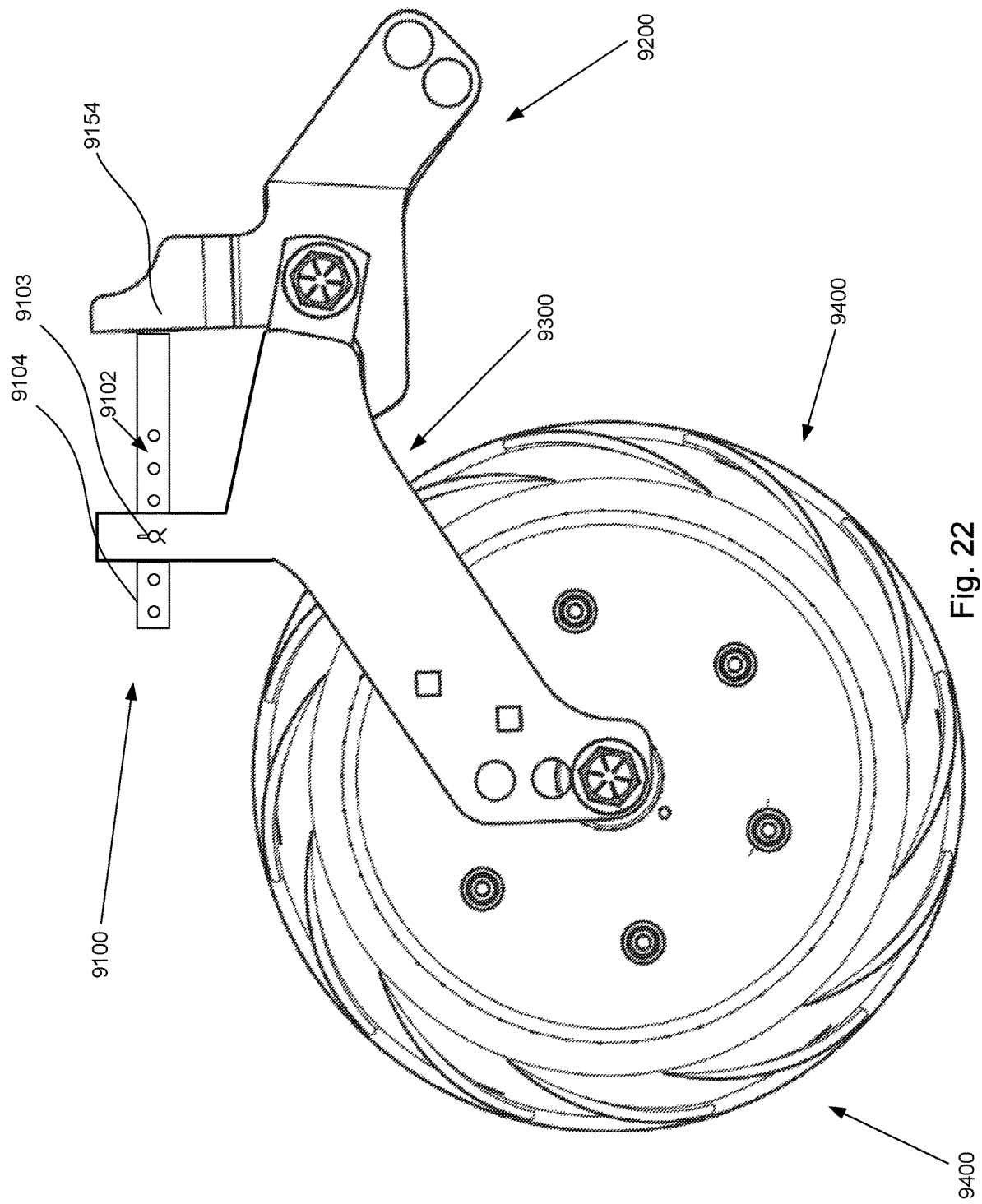
FIG. 22 provides a side view of a second stage row closing assembly with a locking pin depth limiting assembly according to an embodiment of the present invention.

With reference now to FIGS. 21 and 22, left side views of alternate embodiments of a depth limiting assembly for a second stage row closing unit are provided. FIG. 21 provides a left side view of the second stage closing unit 8000 comprising the threaded bolt depth limiting assembly 8100, the first frame assembly 8200, second frame assembly 8300, and wheel assembly 8400. The second stage closing unit 8000, first frame assembly 8200 and second frame assembly 8300 are similar to the second stage closing unit 1000 shown in FIGS. 1-7, but a threaded bolt depth limiting assembly 8100 is used in place of the cam assembly 1100. The threaded bolt depth limiting assembly 8100 comprises a threaded bolt 8102, and a set of nuts 8103 and 8104. The nuts 8103 and 8104 or other suitable means may be used to lock the threaded bolt 8102 in a desired position. The threaded bolt 8102 may be threaded in or out of the second frame assembly 8300 such that when the distal end of the bolt 8102 abuts the stop 8154, the second frame assembly 8300 is "locked" in a similar manner to the cam-based system. The distance the bolt 8102 protrudes adjusts the position in which the second stage row closing unit 8000 is "locked" and adjusts the depth and pressure of the wheel 8400 and of any first stage row closing unit.

FIG. 22 provides a left side view of the second stage closing unit 9000 comprising the locking pin depth limiting assembly 9100, the first frame assembly 9200, second frame assembly 9300, and wheel assembly 9400. The second stage closing unit 9000, first frame assembly 9200 and second frame assembly 9300 are similar to the second stage closing unit 1000 shown in FIGS. 1-7, but a locking pin depth limiting assembly 9100 is used in place of the cam assembly 1100. The locking pin depth limiting assembly 9100 comprises a pin 9104, and a set of pin openings 9102 and is secured by a locking pin and cotter pin 9103 or other suitable securing means. The set of pin openings 9102 may be used to lock the pin 9104 in a desired position using the locking pin 9103. The pin 9104 may be a cylinder, bar stock, or other suitable structure for adjusting the depth, pressure, and or position of the second frame assembly 9300. The pin 9104 may be adjusted in or out of the second frame assembly 9300 such that when the distal end of the pin 9104 abuts the stop 9154, the second frame assembly 9300 is "locked" in a similar manner to the cam-based system. The distance the pin 9104 protrudes adjusts the position in which the second stage row closing unit 9000 is "locked" and adjusts the depth and pressure of the wheel 9400 and of any first stage row closing unit.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

It should be noted that the present systems and/or methods are not limited to the specific embodiments described herein, but is intended to apply to all similar systems and/or methods for removing debris and/or providing a certain amount of tilling. Modifications and alterations from the described embodiments will occur to those skilled in the art without departure from the spirit and scope of the present systems and/or methods. It should be noted that the present invention is not limited to the specific embodiments pictured and described herein but is intended to apply to all similar methods for ground surface penetration during operation of planter, seeder or drill unit. Accordingly, modifications and alterations from the described embodiments will occur to those skilled in the art without departure from the spirit and scope of the present invention, the scope of which is only limited by the appended claims that follow.

What is claimed is:

1. A two-stage row closing system adapted to be connected to a row planter unit for closing a furrow opened by a furrowing unit during seed planting operation of the row planter unit, the two-stage row closing system comprising:
   a first stage row closing unit comprising at least one closing wheel blade and providing a first closing operation; and
   a second stage row closing unit, the second stage row closing unit trailing the first stage row closing unit relative to a forward direction of the row planter unit and providing a second closing operation, the second stage row closing unit comprising:
   a first frame assembly fixedly secured to the first stage row closing unit;
   a second frame assembly rotatably secured to the first frame assembly such that the second frame assembly may move independently relative to the first frame assembly; and
   a depth limiting assembly adapted to provide an upper limit on the rotational movement of the second frame assembly relative to the first frame assembly.

2. The two-stage row closing system of claim 1, wherein the depth limiting assembly comprises a cam and cam stop.

3. The two-stage row closing system of claim 1, wherein the depth limiting assembly comprises one of a threaded bolt or a locking pin assembly.

4. The two-stage row closing system of claim 1, wherein the depth limiting assembly, when engaged at the upper limit, permits the first stage row closing unit and second stage row closing unit to move together.

5. The two-stage row closing system of claim 1, wherein the depth limiting assembly, when engaged at the upper limit, permits the transfer of a down pressure force from the first stage row closing unit to the second stage row closing unit.

6. The two-stage row closing system of claim 1, further comprising a wheel assembly.

7. The two-stage row closing system of claim 6, wherein the wheel assembly comprises a firming wheel.

8. The two-stage row closing system of claim 1, wherein the two-stage row closing system is hinged at the connection between the first frame assembly and the second frame assembly, wherein the second frame assembly moves independently from the first frame assembly and the first stage row closing unit about the hinged connection-.

9. The two-stage row closing system of claim 8, wherein the first stage row closing unit and second stage row closing unit pivot in unison about a mounting point of the first stage row closing unit when the depth limiting assembly is engaged.

10. The two-stage row closing system of claim 1, wherein the depth limiting assembly comprises an adjustment means.

11. The two-stage row closing system of claim 1, wherein the first stage row closing unit comprises one of a single row closing wheel or a pair of row closing wheels.

12. A row closing unit adapted to be connected to a first stage row closing unit of a row planter unit to assist in closing a furrow opened by a furrowing unit during seed planting operation of the row planter unit, the row closing unit comprising:
    a first frame assembly fixedly secured to a frame of the first stage row closing unit, the first stage row closing unit providing a first closing operation and the first frame assembly trailing the first stage row closing unit relative to a forward direction of a row planter unit;
    a second frame assembly rotatably secured to the first frame assembly such that the second frame assembly may move independently relative to the first frame assembly;
    wherein the row closing unit provides a second closing operation following the first closing operation; and
    a depth limiting assembly adapted to provide an upper limit on the rotational movement of the second frame assembly relative to the first frame assembly.

13. The row closing unit of claim 12, wherein the depth limiting assembly comprises a cam and cam stop.

14. The row closing unit of claim 12, wherein the depth limiting assembly comprises one of a threaded bolt or a locking pin assembly.

15. The row closing unit of claim 12, wherein the depth limiting assembly, when engaged at the upper limit, permits the first stage row closing unit and second stage row closing unit to move together.

16. The row closing unit of claim 12, wherein the depth limiting assembly, when engaged at the upper limit, permits the transfer of a down pressure force from the first stage row closing unit to the second stage row closing unit.

17. The row closing unit of claim 12, further comprising a wheel assembly.

18. The row closing unit of claim 17, wherein the wheel assembly comprises a firming wheel.

19. The row closing unit of claim 12, wherein the two-stage row closing system is hinged at the connection between the first frame assembly and the second frame assembly.

20. The row closing unit of claim 12, wherein the depth limiting assembly comprises an adjustment means.

* * * * *